(12) United States Patent
Funamoto et al.

(10) Patent No.: US 9,426,008 B2
(45) Date of Patent: Aug. 23, 2016

(54) SIGNAL PROCESSING DEVICE AND METHOD

(75) Inventors: Kazuhisa Funamoto, Kanagawa (JP); Kazuhiro Oguchi, Tokyo (JP); Kazukuni Takanohashi, Saitama (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 12/951,687

(22) Filed: Nov. 22, 2010

(65) Prior Publication Data

US 2011/0140855 A1 Jun. 16, 2011

(30) Foreign Application Priority Data

Dec. 15, 2009 (JP) ................................. 2009-283761

(51) Int. Cl.
| | |
|---|---|
| *H04Q 5/22* | (2006.01) |
| *H04L 27/227* | (2006.01) |
| *H04L 7/04* | (2006.01) |
| *H04H 60/11* | (2008.01) |
| *H04B 1/10* | (2006.01) |
| *H04L 27/26* | (2006.01) |
| *H04L 5/00* | (2006.01) |

(52) U.S. Cl.
CPC .......... *H04L 27/2278* (2013.01); *H04B 1/1027* (2013.01); *H04H 60/11* (2013.01); *H04L 7/042* (2013.01); *H04L 27/2662* (2013.01); *H04L 5/0007* (2013.01)

(58) Field of Classification Search
CPC ... H04L 7/042; H04L 5/0007; H04L 25/0212; H04L 27/2676; H04H 60/11; H04B 1/707; H04B 1/1027

USPC ........ 340/10.2, 10.1; 375/140, 340, 260, 324; 455/550.1; 396/321; 714/755; 370/208, 370/312, 350

See application file for complete search history.

(56) References Cited

U.S. PATENT DOCUMENTS

| | | | | | |
|---|---|---|---|---|---|
| 5,898,684 | A  * | 4/1999 | Currivan | ................ | H04L 7/042 370/350 |
| 6,711,123 | B1 * | 3/2004 | Taira | ....................... | H04L 7/042 370/206 |
| 7,391,967 | B2 * | 6/2008 | Shizukuishi | .......... | G03B 17/24 348/207.2 |
| 8,019,008 | B2 * | 9/2011 | Karino | ................. | H04L 5/0007 375/260 |
| 8,081,716 | B2 * | 12/2011 | Kang | .................... | H04H 60/11 375/324 |
| 8,340,234 | B1 * | 12/2012 | Cheng | ................. | H04L 25/0212 375/348 |

(Continued)

FOREIGN PATENT DOCUMENTS

JP 2006-33281 2/2006

*Primary Examiner* — Mirza Alam
(74) *Attorney, Agent, or Firm* — Chip Law Group

(57) ABSTRACT

Disclosed herein is a signal processing device including: a correlation signal output unit configured to, about a received signal transmitted from another device, calculate a correlation value between the received signal and a pattern of a waveform of a known signal and output the calculated correlation value as a correlation signal in a time corresponding to one symbol; a known signal determiner configured to determine, based on the correlation signal, whether or not the received signal is modulated by the known signal in a first interval defined when the time corresponding to one symbol is divided into a plurality of intervals; and an identifier configured to identify a series of the symbol based on a result of the determination.

15 Claims, 17 Drawing Sheets

(56) References Cited

U.S. PATENT DOCUMENTS

| | | | |
|---|---|---|---|
| 2004/0130438 A1* | 7/2004 | Garber | 340/10.2 |
| 2005/0063297 A1* | 3/2005 | Sakata et al. | 370/208 |
| 2005/0075126 A1* | 4/2005 | Sugiura | 455/550.1 |
| 2005/0117667 A1* | 6/2005 | Yajima | H04L 27/2676 375/324 |
| 2007/0019749 A1* | 1/2007 | Gaikwad et al. | 375/260 |
| 2008/0079545 A1* | 4/2008 | McLaren | H04B 1/1027 340/10.2 |
| 2009/0168848 A1* | 7/2009 | Constantinidis | H04B 1/707 375/140 |
| 2009/0252075 A1* | 10/2009 | Ji | H04W 56/00 370/312 |
| 2011/0107176 A1* | 5/2011 | Song | H03M 13/1515 714/755 |

* cited by examiner

FIG.2
| LOGIC 1 | LOGIC 0 |
|---|---|
| FIRST-HALF (50%) SUBCARRIER-PRESENT 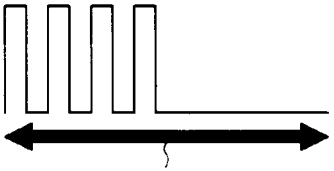 1 etu (SERIES D) | SECOND-HALF (50%) SUBCARRIER-PRESENT 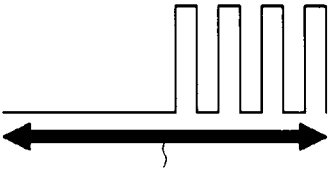 1 etu (SERIES E) |
| COMMUNICATION START (FRAME HEAD) | COMMUNICATION END |
|---|---|
| FIRST-HALF (50%) SUBCARRIER-PRESENT 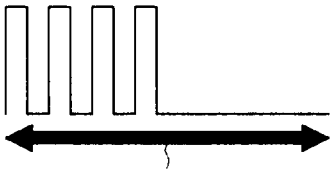 1 etu (SERIES D) | SUBCARRIER-ABSENT 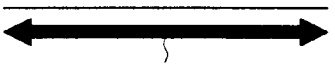 1 etu (SERIES F) |

FIG.8A

SIGNAL d3

◄──────────► ◄──────────►
FIRST-HALF      SECOND-HALF
 1/2 etu         1/2 etu

FIG.8B

SIGNAL d4

91 ⇐ THRESHOLD

SIGNAL d6   ↑~81-1    ↑~81-2    ↑~81-3

SIGNAL d7   ↑~82-1              ↑~82-2

SIGNAL d3

FIRST-HALF 1/2 etu
SECOND-HALF 1/2 etu

SIGNAL d4

THRESHOLD

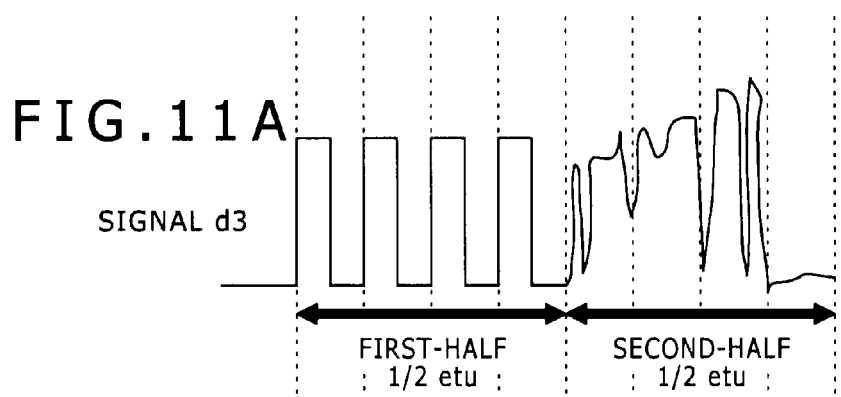
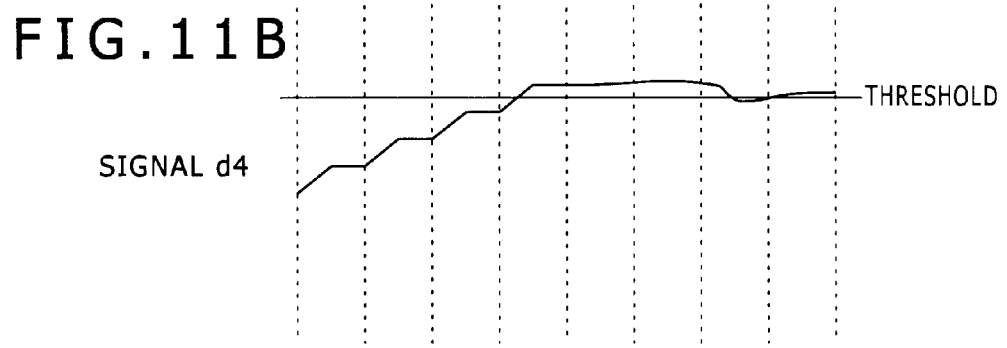

SIGNAL PROCESSING DEVICE AND METHOD

BACKGROUND OF THE INVENTION

1. Field of the Invention

The present invention relates to signal processing device and method, and particularly to signal processing device and method that allow accurate detection of a subcarrier with a simple configuration.

2. Description of the Related Art

In recent years, a contactless IC card system employing a contactless IC card is becoming prevalent in a transportation system, a security system, an electronic money system, etc.

In such a system employing a contactless IC card, upon the entering of the contactless IC card into a communication-allowed distance from a reader/writer, initially the reader/writer radiates electromagnetic waves to the contactless IC card via an antenna. In this state, the reader/writer transmits a signal for requesting data reply to the contactless IC card via the antenna. In response to this signal, the contactless IC card load-modulates the requested data as reply data and sends out the load-modulated signal to the reader/writer via an antenna part.

The reader/writer receives the signal load-modulated by the contactless IC card and demodulates the signal to thereby acquire the reply data. Such demodulation processing is generally realized by a demodulator incorporated into the reader/writer.

The demodulator is configured as e.g. a circuit incorporated into an IC chip. As described above, it is possible that the demodulator is incorporated into a reader/writer and demodulates a signal transmitted from a contactless IC card. In addition, it is also possible that the demodulator is incorporated into a contactless IC card and demodulates a signal transmitted from a reader/writer.

Hereinafter, as the operating mode of demodulation processing by the demodulator, the operating mode when a signal transmitted from a reader/writer is received will be referred to as the card mode, and the operating mode when a signal transmitted from a contactless IC card is received will be referred to as the reader/writer mode. In the following, the demodulator that operates in the reader/writer mode will be mainly described.

Furthermore, in the description of the present specification, the one-data period representing one-bit data in a demodulated signal will be referred to as the etu (Elementary Time Unit), and it is assumed that the data value of each bit is modulated by the bit coding system defined for each communication system.

Presently, the format of a signal transmitted from a reader/writer to a contactless IC card or the format of a signal transmitted from a contactless IC card to a reader/writer is defined by the standards of e.g. ISO14443 and ISO18092. Three types exist as the types of the signal format defined by these standards.

Specifically, the Type A system (ISO14443-A), the Type B system (ISO14443-B), and the Type C system (referred to also as the Felica system) exist.

For example, a contactless IC card of the Type A system load-modulates a carrier (carrier wave) of 13.56 MHz by a subcarrier of 847 KHz (to be exact, 847.5 KHz) depending on reply data to a reader/writer, to thereby generate a reply signal. Specifically, in the Type A system, in 1 etu representing one-bit data, a data value "1" is represented by a symbol in which the subcarrier is superimposed during the first-half period of this 1 etu for example. Furthermore, in 1 etu representing one-bit data, a data value "0" is represented by a symbol in which the subcarrier is superimposed during the second-half period of this 1 etu.

Moreover, the above-described three Types have frame header information and communication end information different from each other. For example, in the Type A system, at the communication start, a symbol of series D comes as the first-bit received signal (start of communication (SOC)). This serves as the frame header information. Furthermore, in the Type A system, the advent of a symbol of series F (without subcarrier modulation) indicates the communication end.

For example, Japanese Patent Laid-open No. 2006-33281 (hereinafter, Patent Document 1) discloses a related-art reader/writer device that receives a signal load-modulated by the subcarrier in a contactless IC card of the Type A system.

According to Patent Document 1, the reader/writer repeatedly transmits a signal for requesting data reply to the contactless IC card of the Type A system (this will be referred to as the polling processing).

If the contactless IC card of the Type A system exists near the reader/writer, the reader/writer receives a reply sent out from this contactless IC card. At this time, the reader/writer extracts a subcarrier component from the received signal. Furthermore, the in-phase component (I-signal) and the quadrature component (Q-signal) of the subcarrier component are detected to be supplied to a demodulator.

The demodulator squares the I-signal and the Q-signal to add the squaring result and take the square root of the addition result. Then the demodulator supplies a calculation result signal obtained as the result to a moving average unit. In the calculation result signal, the signal level of the subcarrier component superimposed on the received signal appears.

The calculation result signal is integrated by the moving average unit in units of ½ etu, and the obtained integral result signals are sequentially supplied to a shift register.

A timing generator takes timing synchronization in units of ½ etu with the received signal and generates an internal clock rising at the end timing of the ½-etu cycle to output the internal clock to the shift register and a subcarrier signal level detector. Furthermore, the timing generator takes timing synchronization in units of 1 etu with the received signal and generates an internal clock rising at the end timing of the etu cycle to output the internal clock to the subcarrier signal level detector.

The timing synchronization in units of 1 etu and in units of ½ etu between the internal clock and the received signal can be taken by detecting the SOC. Specifically, the SOC detected from the received frame is regarded as the start point and an enable is generated at each of the cycles of 1 etu and ½ etu defined by the standards.

The shift register sequentially latches the results of the moving average of the ½-etu interval in synchronization with the input clock of ½ etu. Thereby, the shift register stores the integral results each corresponding to a respective one of first-half ½ etu and second-half ½ etu of the unit symbol interval.

A subcarrier signal determiner reads out, from the shift register, the integral results each corresponding to a respective one of first-half ½ etu and second-half ½ etu of the unit symbol interval as the subcarrier component signal level of each ½ etu, in synchronization with the clock of 1 etu. Subsequently, a threshold determination is made twice every 1 etu for the obtained subcarrier component signal level of each ½ etu and thereby whether a subcarrier component is present or absent is determined.

In the threshold determination, if the signal level of the subcarrier component in a ½-etu period surpasses a predetermined threshold, it is determined that the subcarrier exists in this ½-etu period. If the integral result signal indicating the signal level of the subcarrier component in the ½-etu period is equal to or lower than the predetermined threshold, it is determined that the subcarrier does not exist in this ½-etu period.

In the threshold determination, if it is determined that the subcarrier exists in the first-half period and the subcarrier does not exist in the second-half period, it is determined that this one-data period is equivalent to series D (data value "1"). If it is determined that the subcarrier does not exist in the first-half period and the subcarrier exists in the second-half period, it is determined that this one-data period is equivalent to series E (data value "0").

If it is determined that the subcarrier exists in neither the first-half period nor the second-half period, it is determined that this one-data period is equivalent to series F (e.g. non-modulation period). If it is determined that the subcarrier exists in both the first-half period and the second-half period, it is determined that this one-data period is equivalent to collision.

Due to the above-described scheme, the demodulator can reproduce data returned from the contactless IC card of the Type A system one bit by one bit and also can make determinations relating to the frame end and collision.

SUMMARY OF THE INVENTION

When demodulation is carried out by the technique of Patent Document 1, the subcarrier is detected by regarding the value resulting from the integral of the IQ amplitude for each ½ etu interval as the signal level, and collision determination and decoding are performed. Furthermore, a threshold determination is made regarding whether a subcarrier signal is present or absent in accordance with the magnitude of the amplitude of the received signal, irrespective of the magnitude of the correlation between the received waveform and the desired subcarrier waveform.

However, generally large noise is frequently included in a transmitted signal from the contactless IC card side. Therefore, determining whether a subcarrier signal is present or absent as shown in Patent Document 1 involves a problem that, when a signal including large noise is subjected to the threshold determination, the signal is erroneously detected as a subcarrier signal.

For example, a consideration will be made below about the case in which a reader/writer receives a signal that originally has a non-modulation period (series F) as its one-data period but includes noise in the second-half period of its waveform.

As described above, in the related-art system, a subcarrier determination is made by making a threshold determination about the power (the value of integral) for each ½ bit. Therefore, if a signal that is originally a signal of series F but includes noise in the second-half period of its waveform is received, it is determined that the subcarrier does not exist in the first-half period but the subcarrier exists in the second-half period, and it is determined that this one-data period is equivalent to series E (data value "0"). As a result, the transmitted waveform whose data period is the non-modulation period (series F) is erroneously regarded as series E (data value "0").

Furthermore, a consideration will be made below about the case in which a reader/writer receives a signal in which noise is included in the second-half period of the transmitted waveform in which originally a subcarrier exists in the first-half period and the subcarrier does not exist in the second-half period.

In the related-art system, a subcarrier determination is made by making a threshold determination about the power for each ½ etu. Therefore, it is determined that the subcarrier exists in the first-half period and the subcarrier exists in the second-half period, and it is erroneously determined that this one-data period is equivalent to collision.

As just described, the related-art technique involves a problem that oscillation in the waveform due to noise or the like is erroneously regarded as subcarrier modulation and as a result erroneous data or the like is demodulated.

There is a desire for the present invention to allow accurate detection of a subcarrier with a simple configuration.

According to one embodiment of the present invention, there is provided a signal processing device including correlation signal output means for, about a received signal transmitted from another device, calculating a correlation value between the received signal and the pattern of the waveform of a known signal and outputting the calculated correlation value as a correlation signal in a time corresponding to one symbol, and known signal determination means for determining, based on the correlation signal, whether or not the received signal is modulated by the known signal in a first interval defined when the time corresponding to one symbol is divided into a plurality of intervals, and identifying means for identifying a series of the symbol based on a result of the determination.

According to another embodiment of the present invention, there is provided a signal processing method including the steps of, about a received signal transmitted from another device, calculating a correlation value between the received signal and the pattern of the waveform of a known signal and outputting the calculated correlation value as a correlation signal in a time corresponding to one symbol by correlation signal output means, and determining, based on the correlation signal, whether or not the received signal is modulated by the known signal in a first interval defined when the time corresponding to one symbol is divided into a plurality of intervals by known signal determination means, and identifying a series of the symbol based on a result of the determination by an identifier.

In the embodiments of the present invention, about the received signal transmitted from another device, the correlation value between the received signal and the pattern of the waveform of the known signal is calculated and the calculated correlation value is output as the correlation signal in the time corresponding to one symbol. Based on the correlation signal, whether or not the received signal is modulated by the known signal in the first interval defined when the time corresponding to one symbol is divided into a plurality of intervals is determined. Subsequently, the series of the symbol is identified based on the result of the determination.

The embodiments of the present invention allow accurate detection of a subcarrier with a simple configuration.

BRIEF DESCRIPTION OF THE DRAWINGS

FIG. 2 is a diagram for explaining bit coding in communication by the Type A system;

FIGS. 8A and 8B are diagrams showing an example of the waveforms of the respective signals in the demodulator of FIG. 3;

FIGS. 11A and 11B are diagrams showing an example of the waveform of the signal including noise and the waveform of the moving average signal;

DETAILED DESCRIPTION OF THE PREFERRED EMBODIMENTS

Embodiments of the present invention will be described below with reference to the drawings.

First, a related-art system will be described below.

Figure 1:
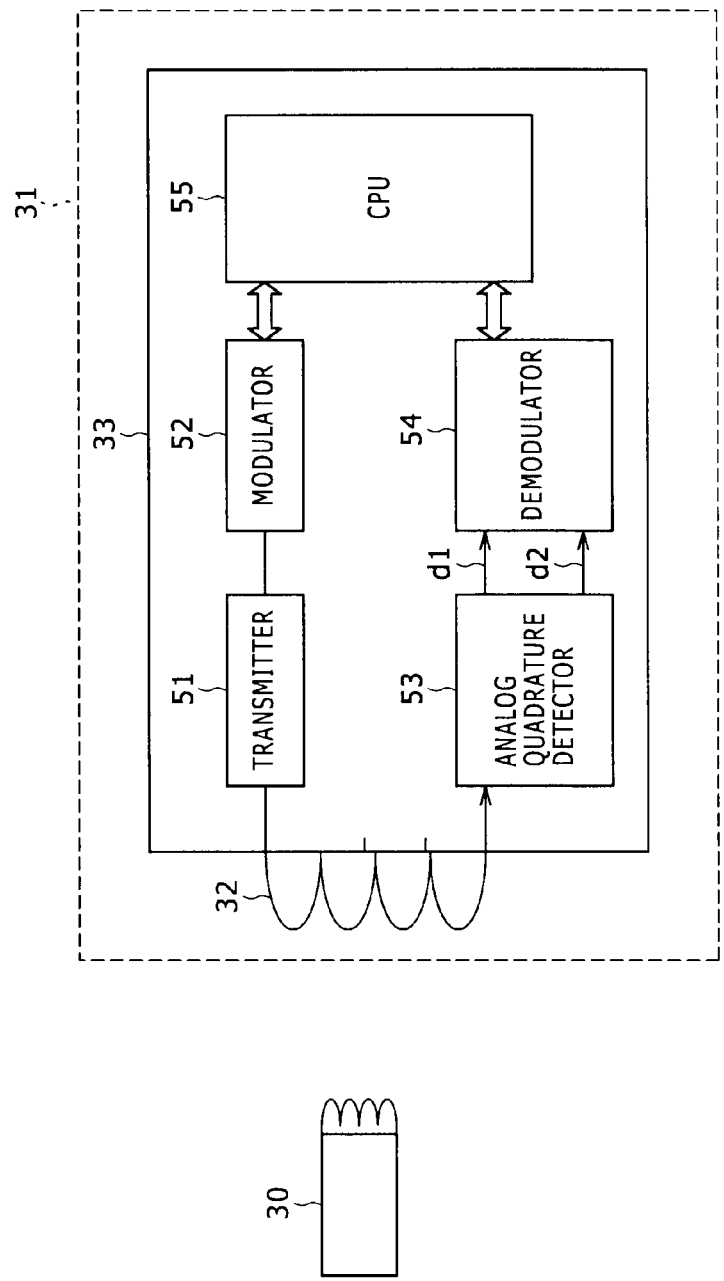
FIG. 1 is a block diagram showing a configuration example of a communication system composed of a contactless IC card and a reader/writer in a related art.

FIG. 1 is a block diagram showing a configuration example of a communication system composed of a contactless IC card and a reader/writer in a related art. In the example of FIG. 1, a contactless IC card 30 and a reader/writer 31 communicate with each other by the Type A communication system prescribed by ISO14443-3.

When transmitting data to the reader/writer, the contactless IC card of the Type A system load-modulates a carrier (carrier wave) of 13.56 MHz by a subcarrier of 847 KHz (to be exact, 847.5 KHz) to thereby generate a signal.

Specifically, in the Type A system, in 1 etu representing one-bit data, a data value "1" is represented by a symbol in which the subcarrier is superimposed only during the first-half period of this 1 etu for example. Furthermore, in 1 etu representing one-bit data, a data value "0" is represented by a symbol in which the subcarrier is superimposed only during the second-half period of this 1 etu.

Moreover, the above-described three Types have frame header information and communication end information different from each other. For example, in the Type A system, at the communication start, a symbol of a data value "1" (series D) comes as the first-bit received signal (start of communication (SOC)). This serves as the frame header information. Furthermore, in the Type A system, the advent of a symbol of series F (without subcarrier modulation) indicates the communication end.

The reader/writer 31 has an antenna 32 for transmitting/receiving a signal to/from the contactless IC card 30 and a semiconductor integrated circuit 33 connected to the antenna 32.

When communication between the contactless IC card 30 and the reader/writer 31 is started, a CPU 55 of the reader/writer 31 repeatedly transmits a signal for requesting response reply via the antenna 32 to the contactless IC card 30 capable of communication by the Type A system. This processing is referred to as polling. Data output from the CPU 55 is ASK-modulated via a modulator 52, and electric waves are sent out from the antenna 32 via a transmitter 51.

If the contactless IC card 30 exists near the antenna 32, the reader/writer 31 receives a signal returned from the contactless IC card 30 via the antenna 32. The contactless IC card 30 returns a signal obtained by load-modulating data of a communication rate of 106 kbps to the reader/writer 31.

FIG. 2 is a diagram for explaining bit coding in the communication by the Type A system. This diagram shows bit coding in a signal transmitted from the contactless IC card 30 to the reader/writer 31.

As shown in FIG. 2, logic 1 and logic 0 are each represented based on the presence and absence of the subcarrier in the 1-etu interval. Logic 1 means one-bit data whose value is 1, and logic 0 means one-bit data whose value is 0. The one-data period representing one-bit data is referred to as 1 etu (Elementary Time Unit).

The arrowheads represented below the respective waveforms shown in FIG. 2 each indicate 1 etu. Each waveform diagram is so made that the abscissa indicates the time and the ordinate indicates the signal level. As shown in FIG. 2, the waveform in the interval with subcarrier modulation has a fine comb shape. Specifically, the signal level does not change in the interval (time) without subcarrier modulation, whereas the signal level changes with the same cycle as that of the subcarrier in the interval (time) with subcarrier modulation.

In FIG. 2, the waveforms of 1 etu corresponding to logic 1, logic 0, communication start, and communication end are shown. Each of these four waveforms is information that should be transmitted from the contactless IC card 30 to the reader/writer 31, and corresponds to one symbol obtained when the above-described data of the communication rate of 106 kbps is subjected to bit coding by a predetermined coding system (e.g. Manchester coding system).

Logic 1 shown on the upper left side of FIG. 2 is represented by a waveform obtained by subcarrier modulation only during the interval of first-half 50% of 1 etu. This waveform will be referred to as series D. Logic 0 shown on the upper right side of FIG. 2 is represented by a waveform obtained by subcarrier modulation only during the interval of second-half 50% of 1 etu. This waveform will be referred to as series E.

As described above, in the Type A system, at the communication start, series D comes as the first-bit received signal (start of communication (SOC)). This serves as the frame header information (lower left in FIG. 2). Moreover, in the Type A system, the advent of a waveform in which subcarrier modulation is absent in the interval of 100% of 1 etu indicates the communication end. This waveform will be referred to as series F (lower right in FIG. 2).

These series serve as e.g. symbols represented by the 1-etu interval of a signal transmitted from a contactless IC card.

The signal received by the antenna 32 of the reader/writer 31 is supplied to an analog quadrature detector 53, and the analog quadrature detector 53 extracts a subcarrier component from the received signal and detects the in-plane component (I-signal) and the quadrature component (Q-signal) of the subcarrier component. These I-signal and Q-signal are supplied to a demodulator 54 via a signal line d1 and a signal lien d2, respectively.

The analog quadrature detector 53 carries out A/D conversion of the quadrature-detected signal and carries out oversampling at a frequency of 13.56 MHz. At this time, the number of samples in the 1-etu interval is 128 (13.56 MHz÷106 KHz). Furthermore, because the subcarrier frequency in the Type A communication system is 847 KHz as described above, the number of samples in one subcarrier cycle is 16 (=13.56 MHz÷847 KHz).

The demodulator 54 determines whether a subcarrier component is present or absent as described later to thereby demodulate the data transmitted from the contactless IC card 30. The data as the demodulation result is supplied to the CPU 55.

Figure 3:
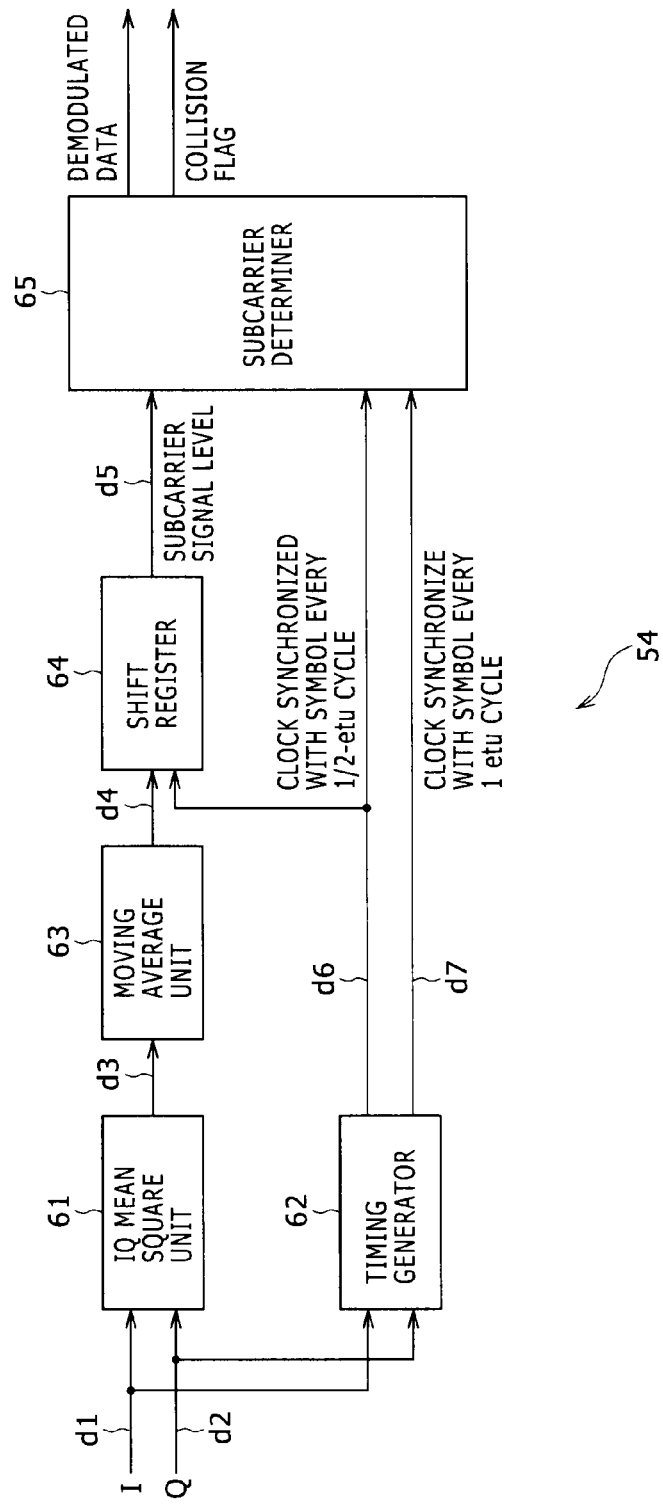
FIG. 3 is a block diagram showing a detailed configuration example of a demodulator in the related art.

FIG. 3 is a block diagram showing a detailed configuration example of the demodulator 54. As shown in FIG. 3, the demodulator 54 includes an IQ mean square unit 61, a timing generator 62, a moving average unit 63, a shift register 64, and a subcarrier determiner 65.

As shown in FIG. 3, the I-signal and the Q-signal output from the analog quadrature detector 53 are supplied to the IQ mean square unit 61 and the timing generator 62 via the signal line d1 and the signal line d2. Hereinafter, signals transmitted via the signal line d1 and the signal line d2 will be accordingly referred to as the signal d1 and the signal d2, respectively. This applies also to other signals.

Figure 4:
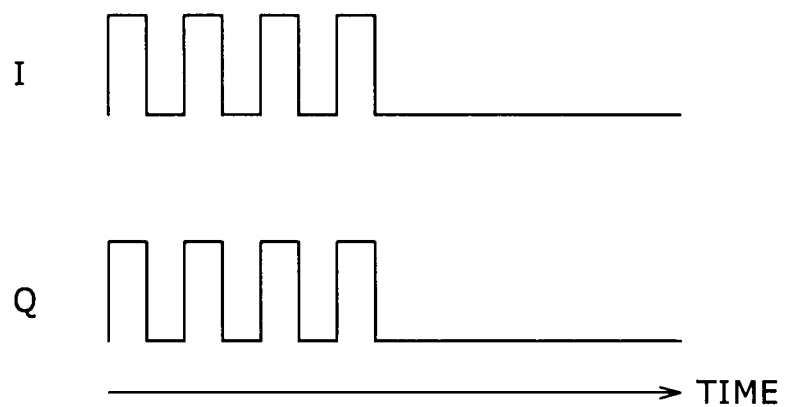
FIG. 4 is a diagram showing an example of the waveforms of an I-signal and a Q-signal resulting from analog quadrature detection.

FIG. 4 is a diagram showing an example of the waveforms of the signal d1 (I-signal) and the signal d2 (Q-signal). In FIG. 4, the waveforms of the respective signals are so shown that the abscissa indicates the time and the ordinate indicates the signal level. This example shows the waveforms of the I-signal and the Q-signal when series D, which is obtained by subcarrier modulation only during the interval of first-half 50% of 1 etu, is received.

Figure 5:
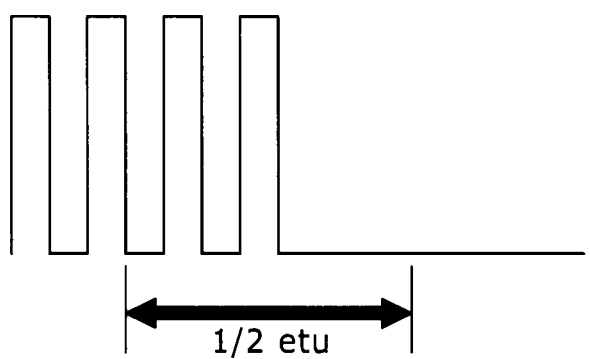
FIG. 5 is a diagram showing an example of the waveform of a signal output through calculation of the mean square of the I-signal and the Q-signal in the demodulator of FIG. 3.

The IQ mean square unit 61 calculates the mean square of each of the I-signal and the Q-signal and outputs the calculation result as a signal d3. FIG. 5 is a diagram showing an example of the waveform of the signal d3. In FIG. 5, the waveform of the signal d3 is so shown that the abscissa indicates the time and the ordinate indicates the signal level.

The timing generator 62 detects the timings of rising-up and falling-down in the waveforms of the signal d1 and the signal d2 to thereby generate a signal d6 as a clock of every ½ etu and a signal d7 as a clock of every 1 etu. Each of the clocks generated by the timing generator 62 is output in synchronization with the symbol with a waveform resulting from bit coding (series representing one bit).

The signal d3 output from the IQ mean square unit 61 is supplied to the moving average unit 63, and the average of the signal level of the waveform in the ½-etu interval is calculated. Specifically, the ½-etu interval indicated by the arrowhead below the waveform in FIG. 5 is slid from the left to the right in the diagram with the elapse of time, and the value of integral of the signal level of the waveform in the ½-etu interval at the time is calculated. Thereby, the averages are sequentially calculated.

Figure 6:
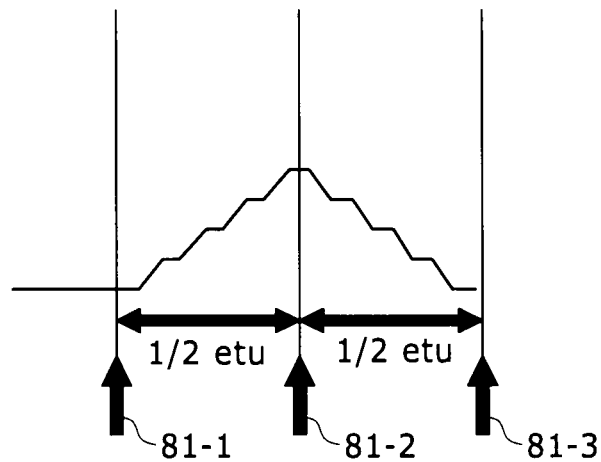
FIG. 6 is a diagram showing an example of the waveform of a signal output through calculation of the average of the signal level in the demodulator of FIG. 3.

The moving average unit 63 calculates the average of the signal level in the above-described manner and outputs the calculation result as a signal d4. FIG. 6 is a diagram showing an example of the waveform of the signal d4. In FIG. 6, the waveform of the signal d4 is so shown that the abscissa indicates the time and the ordinate indicates the signal level.

As shown in FIG. 6, the waveform of series D output through the processing by the moving average unit 63 has a mountain-like shape whose peak comes at the time after the elapse of ½ etu from the start position of the symbol. At the respective times indicated by arrowheads 81-1 to 81-3 in FIG. 6, the clock of every ½ etu is generated by the timing generator 62.

Figure 7:
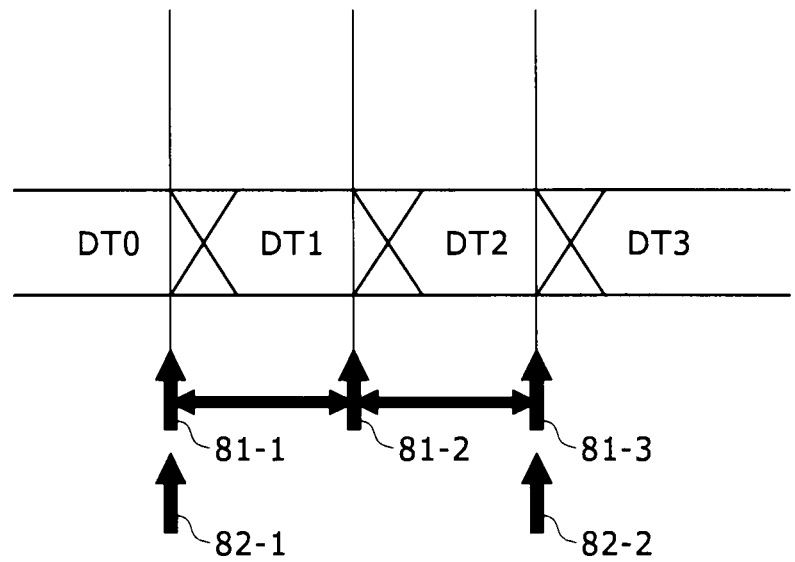
FIG. 7 is a diagram for explaining an example of information latched by a shift register in the demodulator of FIG. 3.

The signal d4 output from the moving average unit 63 is supplied to the shift register 64. The shift register 64 holds (latches) the signal level of the signal d4 at the timing of the supply of the clock of every ½ etu. FIG. 7 is a diagram for explaining an example of the information latched by the shift register 64.

For example, information DT0 to information DT3 shown in FIG. 7 represent the signal level of the signal d4 at the timing of the supply of the clock of every ½ etu. For example, the information DT0 is the value of the signal level corresponding to the clock supplied at the timing of the arrowhead 81-1 (hereinafter, this clock will be accordingly referred to as the clock 81-1, and this applies also to other clocks). The information DT1 is the value of the signal level corresponding to a clock 81-2, and the information DT2 is the value of the signal level corresponding to a clock 81-3.

A signal (information) d5 output from the shift register 64 is supplied to the subcarrier determiner 65. The subcarrier determiner 65 determines whether or not the value of the signal level represented by the signal d5 at the timing of the supply of the clock of every ½ etu surpasses a threshold set in advance. Specifically, if the value of the signal level represented by the signal d5 surpasses the threshold set in advance, it is determined that this ½-etu interval is an interval in which subcarrier modulation is carried out (referred to as a subcarrier-present interval). If the value of the signal level represented by the signal d5 does not surpass the threshold set in advance, it is determined that this ½-etu interval is an interval in which subcarrier modulation is not carried out (referred to as a subcarrier-absent interval).

A further description will be made below with reference to FIGS. 8A and 8B. FIG. 8A is a diagram showing the waveform of the signal d3. In FIG. 8A, the waveform of series D is so shown that the abscissa indicates the time and the ordinate indicates the signal level. That is, a waveform in which the first-half ½-etu interval is a subcarrier-present interval and the second-half ½-etu interval is a subcarrier-absent interval is shown.

FIG. 8B is a diagram showing the waveform of the signal d4. In FIG. 8B, the signal waveform corresponding to the waveform of series D of FIG. 8A is so shown that the abscissa indicates the time and the ordinate indicates the signal level. Arrowheads 81-1 to 81-3 below FIG. 8B each indicate the timing of the clock of the signal d6, and arrowheads 82-1 and 82-2 each indicate the timing of the clock of the signal d7.

As shown in FIG. 8B, the subcarrier determiner 65 determines the signal level of the signal d4 by using a threshold indicated by a line 91. Specifically, at the timings of the arrowheads 81-1 and 81-3, it is determined that the signal level does not surpass the threshold, and it is determined that the ½-etu intervals corresponding to the clocks of these timings are subcarrier-absent intervals. In contrast, at the timing of the arrowhead 81-2, it is determined that the signal level surpasses the threshold, and it is determined that the ½-etu interval corresponding to the clock of this timing is a subcarrier-present interval.

More specifically, the clock at the timing of the arrowhead 81-2 is regarded as the clock corresponding to the first-half ½-etu interval of this symbol, and it is determined that the first-half ½-etu interval of this symbol is a subcarrier-present interval. The clock at the timing of the arrowhead 81-3 is regarded as the clock corresponding to the second-half ½-etu interval of this symbol, and it is determined that the second-half ½-etu interval of this symbol is a subcarrier-absent interval. Consequently, this symbol is identified as symbol D, i.e. logic 1.

The subcarrier determiner 65 identifies the series of the symbol based on the result of the determination as to whether the subcarrier is present or absent as described above and outputs the result as demodulated data.

Figure 9:
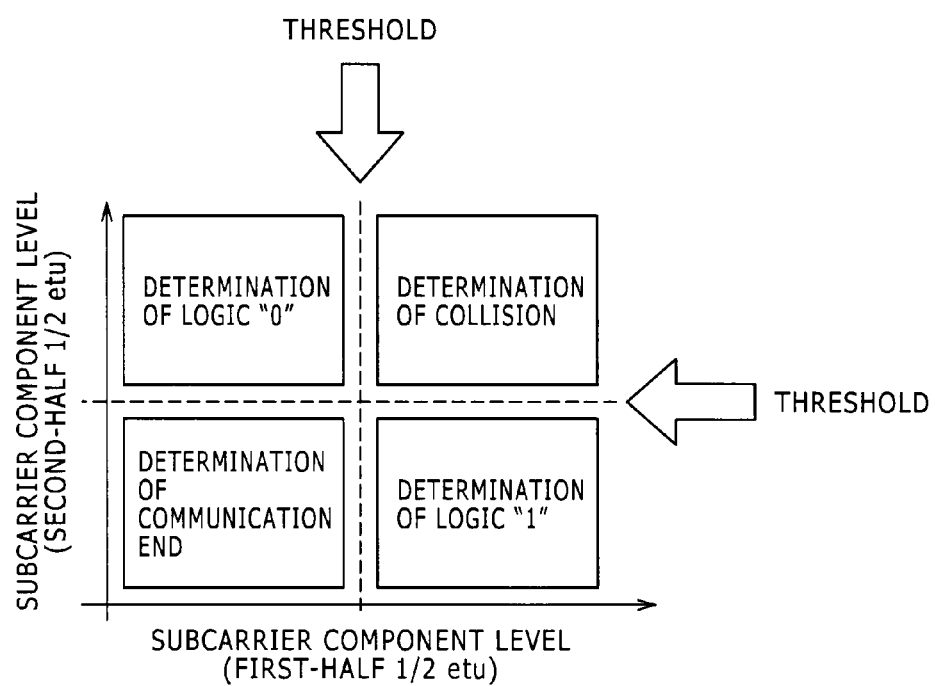
FIG. 9 is a diagram for explaining a system of identification of the series of a symbol by a subcarrier determiner in the demodulator of FIG. 3.

FIG. 9 is a diagram for explaining the system of identification of the series of a symbol by the subcarrier determiner 65. In FIG. 9, the abscissa indicates the signal level (subcarrier component level) of the signal d4 of the first-half ½-etu interval, and the ordinate indicates the signal level (subcarrier component level) of the signal d4 of the second-half ½-etu interval. That is, the signal level of the subcarrier component, i.e. whether the subcarrier is present or absent, is determined about the first-half ½-etu interval and the second-half ½-etu interval separately from each other, and the determination results are each associated with the series of the symbol.

For example, as shown in the lower right side of FIG. 9, if the first-half ½-etu interval is a subcarrier-present interval and the second-half ½-etu interval is a subcarrier-absent interval, this symbol can be identified as series D and thus the subcarrier determiner 65 outputs a bit representing a value 1 (in FIG. 9, logic "1") as demodulated data.

Furthermore, as shown in the upper left side of FIG. 9, if the first-half ½-etu interval is a subcarrier-absent interval and the second-half ½-etu interval is a subcarrier-present interval, this symbol can be identified as series E and thus the subcarrier determiner 65 outputs a bit representing a value 0 (in FIG. 9, logic "0") as demodulated data.

In addition, as shown in the lower left side of FIG. 9, if the first-half ½-etu interval is a subcarrier-absent interval and the second-half ½-etu interval is also a subcarrier-absent interval, this symbol can be identified as series F and thus the subcarrier determiner 65 outputs a bit sequence or the like representing the communication end as demodulated data.

Moreover, as shown in the upper right side of FIG. 9, if the first-half ½-etu interval is a subcarrier-present interval and the second-half ½-etu interval is also a subcarrier-present interval, this symbol is a symbol that can not exist in terms of bit coding. In this case, the subcarrier determiner 65 identifies that collision has occurred. Specifically, it is identified that two contactless IC cards simultaneously exist near the antenna 32 of the reader/writer 31 and collision has occurred because of simultaneous reception of signals transmitted from two contactless IC cards. In this case, the subcarrier determiner 65 outputs a collision flag.

In this manner, the subcarrier determiner 65 can identify the series of the symbol based on the result of the determination as to whether the subcarrier is present or absent and can output the result as demodulated data.

However, generally large noise is frequently included in a signal transmitted from a contactless IC card. Thus, determining whether a subcarrier signal is present or absent by the above-described related-art system involves a problem that, when a signal including large noise is subjected to the threshold determination, the signal is erroneously detected as a subcarrier signal.

With reference to FIGS. 10 and 11, a description will be made below about a determination as to whether the subcarrier is present or absent when noise is included in a signal transmitted from the contactless IC card 30.

Figure 10A:
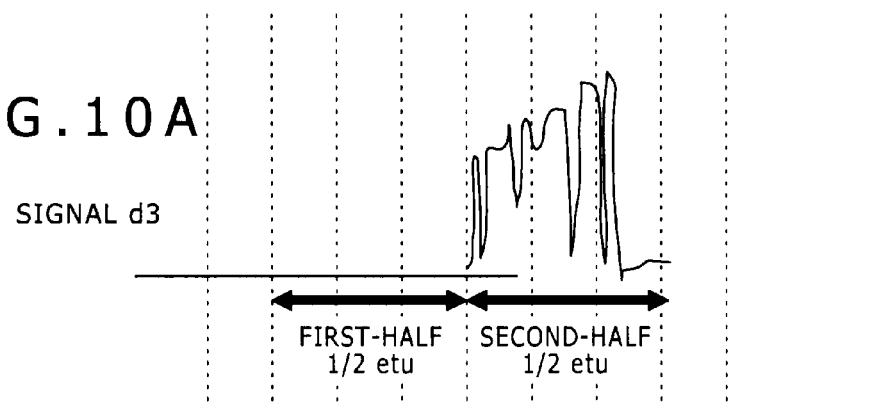
FIGS. 10A and 10B are diagrams showing an example of the waveform of a signal including noise and the waveform of a moving average signal.

FIG. 10A is a diagram showing the waveform of the signal d3. In FIG. 10A, the waveform of the signal d3 is so shown that the abscissa indicates the time and the ordinate indicates the signal level. This example shows a waveform when a signal in which the first-half ½-etu interval is a subcarrier-absent interval and the second-half ½-etu interval is also a subcarrier-absent interval (series F) is received as a signal transmitted from the contactless IC card.

In the case of series F, the waveform of the signal d3 originally has a flat shape as described above with reference to FIG. 2. However, in the present case, the oscillation of the signal level occurs in the second-half ½-etu interval due to the influence of the noise. If the signal d3 like that shown in FIG. 10A is supplied to the moving average unit 63 and the average of the signal level of the waveform in the ½-etu interval is calculated, the signal d4 like that shown in FIG. 10B is output.

Figure 10B:
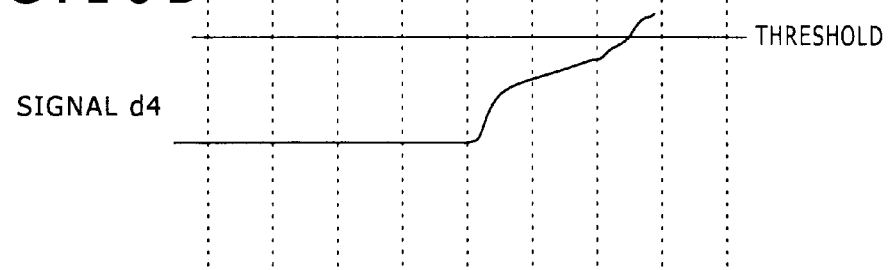

FIG. 10B is a diagram showing the waveform of the signal d4. In FIG. 10B, the waveform corresponding to the waveform of series F of FIG. 10A is so shown that the abscissa indicates the time and the ordinate indicates the signal level.

If whether the subcarrier is present or absent is determined based on the waveform shown in FIG. 10B, it is determined that the second-half ½-etu interval is a subcarrier-present interval. This is because the signal level of the second-half ½-etu interval surpasses the threshold. Thus, it is erroneously determined by the subcarrier determiner 65 that series E is received, although series F is received.

In this manner, due to the influence of the noise, data corresponding to series E (logic 0) is erroneously demodulated from the signal corresponding to series F.

FIG. 11A is a diagram showing the waveform of the signal d3. In FIG. 11A, the waveform of the signal d3 is so shown that the abscissa indicates the time and the ordinate indicates the signal level. This example shows a waveform when a signal in which the first-half ½-etu interval is a subcarrier-present interval and the second-half ½-etu interval is a subcarrier-absent interval (series D) is received as a signal transmitted from the contactless IC card.

In the case of series D, the waveform of the signal d3 originally has a flat shape in the second-half ½-etu interval as described above with reference to FIG. 2. However, in the present case, the oscillation of the signal level occurs in the second-half ½-etu interval due to the influence of noise. If the signal d3 like that shown in FIG. 11A is supplied to the moving average unit 63 and the average of the signal level of the waveform in the ½-etu interval is calculated, the signal d4 like that shown in FIG. 11B is output.

FIG. 11B is a diagram showing the waveform of the signal d4. In FIG. 11B, the waveform corresponding to the waveform of series D of FIG. 11A is so shown that the abscissa indicates the time and the ordinate indicates the signal level.

If whether the subcarrier is present or absent is determined based on the waveform shown in FIG. 11B, it is determined that the second-half ½-etu interval is a subcarrier-present interval. This is because the signal level of the second-half ½-etu interval surpasses the threshold. Thus, it is erroneously determined by the subcarrier determiner 65 that collision has occurred, although series D is received.

In this manner, due to the influence of the noise, the occurrence of collision is erroneously detected from the signal corresponding to series D.

To address this problem, in an embodiment of the present invention, the correlation value with respect to the subcarrier is taken into consideration for the signal used for determining whether the subcarrier is present or absent, in order to prevent noise from being erroneously regarded as the subcarrier.

Figure 12:
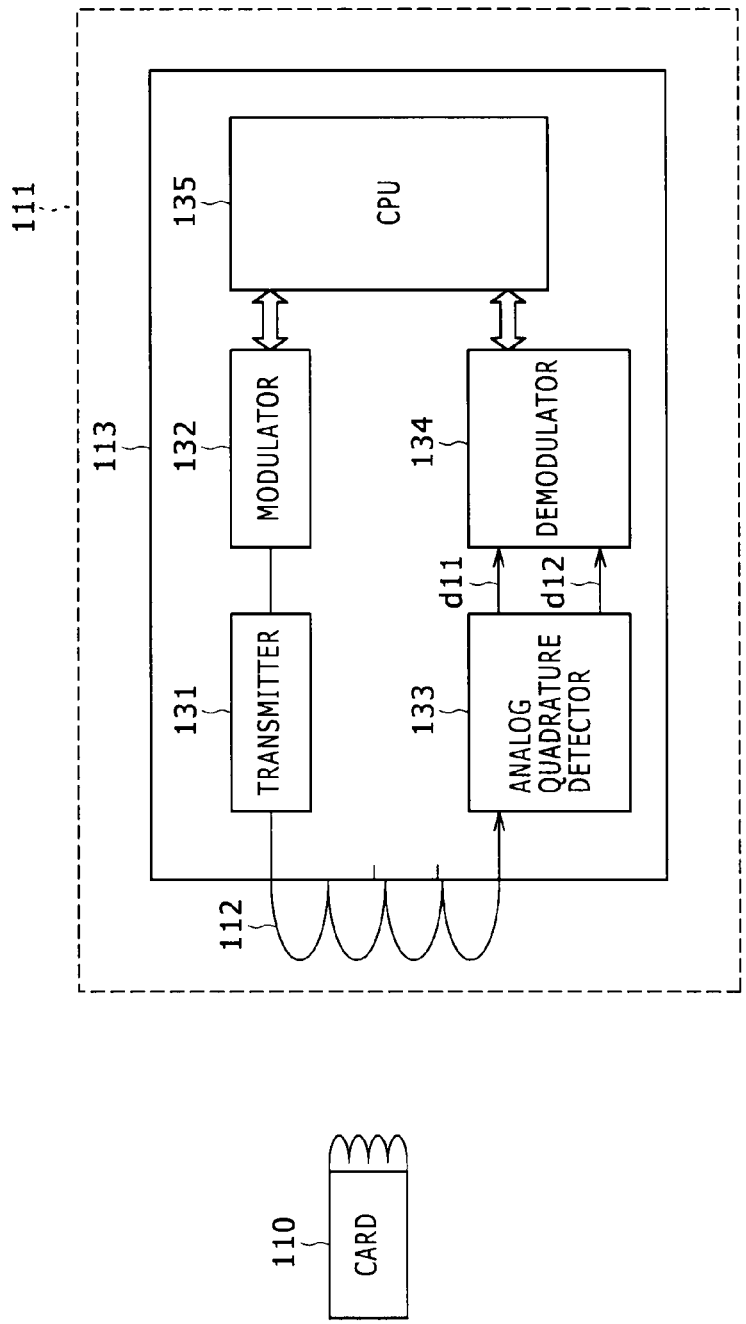
FIG. 12 is a block diagram showing a configuration example of a communication system composed of a contactless IC card and a reader/writer according to one embodiment of the present invention.

FIG. 12 is a block diagram showing a configuration example of a communication system composed of a contactless IC card and a reader/writer according to one embodiment of the present invention. In the example of FIG. 12, a contactless IC card 110 and a reader/writer 111 communicate with each other by the Type A communication system prescribed by ISO14443-3.

The reader/writer 111 has an antenna 112 for transmitting/receiving a signal to/from the contactless IC card 110 and a semiconductor integrated circuit 113 connected to the antenna 112.

When communication between the contactless IC card 110 and the reader/writer 111 is started, a CPU 135 of the reader/writer 111 repeatedly transmits a signal for requesting response reply via the antenna 112 to the contactless IC card 110 capable of communication by the Type A system. This processing is referred to as polling. Data output from the CPU 135 is ASK-modulated via a modulator 132, and electric waves are sent out from the antenna 112 via a transmitter 131.

If the contactless IC card 110 exists near the antenna 112, the reader/writer 111 receives a signal returned from the contactless IC card 110 via the antenna 112. The contactless IC card 110 returns e.g. a signal obtained by load-modulating data of a communication rate of 106 kbps to the reader/writer 111.

The signal received by the antenna 112 of the reader/writer 111 is supplied to an analog quadrature detector 133, and the analog quadrature detector 133 extracts a subcarrier component from the received signal and detects the in-plane component (I-signal) and the quadrature component (Q-signal) of the subcarrier component. These I-signal and Q-signal are supplied to a demodulator 134 via a signal line d11 and a signal line d12, respectively.

The analog quadrature detector 133 carries out A/D conversion of the quadrature-detected signal and carries out oversampling at a frequency of 13.56 MHz. At this time, for example, the number of samples in the 1-etu interval is 128 (13.56 MHz÷106 KHz). Furthermore, because the subcarrier frequency in the Type A communication system is 847 KHz as described above, the number of samples in one subcarrier cycle is 16 (=13.56 MHz÷847 KHz).

The demodulator 134 determines whether a subcarrier component is present or absent as described later to thereby demodulate the data transmitted from the contactless IC card 110. The data as the demodulation result is supplied to the CPU 135.

Figure 13:
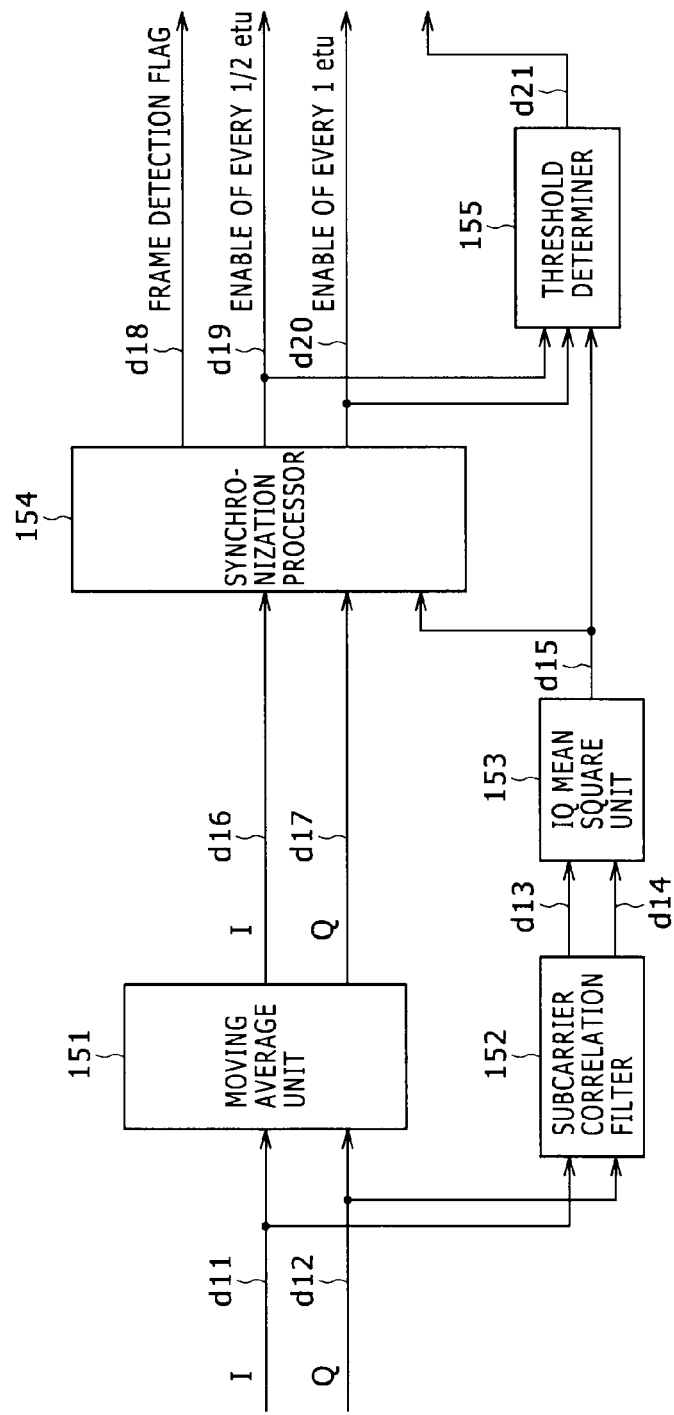
FIG. 13 is a block diagram showing a detailed configuration example of a demodulator in FIG. 12.

FIG. 13 is a block diagram showing a detailed configuration example of the demodulator 134 in FIG. 12. As shown in FIG. 13, the demodulator 134 includes a moving average unit 151, a subcarrier correlation filter 152, an IQ mean square unit 153, a synchronization processor 154, and a threshold determiner 155.

As shown in FIG. 13, the I-signal and the Q-signal output from the analog quadrature detector 133 are supplied to the moving average unit 151 and the subcarrier correlation filter 152 via the signal line d11 and the signal line d12.

The moving average unit 151 calculates the average of the signal level of the waveform in the ⅛-etu interval (one subcarrier cycle) about the signal d11 and the signal d12. For example, the value of integral of the signal level of the waveform in the ⅛-etu interval at the time is calculated, and thereby the averages are sequentially calculated. The signal d11 and the signal d12 are generally output as a rectangular wave. However, the waveforms of a signal d16 and a signal d17 output from the moving average unit 151 have a shape close to a saw-tooth wave.

The signal d16 and the signal d17 obtained through the processing by the moving average unit 151 have almost the same waveforms as those obtained when the signal d11 and the signal d12 are made to pass through a low-pass filter to cut high-frequency noise. Due to this scheme, for example even if the signal d11 and the signal d12 are deformed to a waveform that makes it hard to determine one cycle due to the influence of the reception environment and so forth, the interval of one cycle of the subcarrier can be easily identified by detecting the peaks of the waveforms of the signal d16 and the signal d17. That is, the synchronization processor 154 generates an enable based on the signal d16 and the signal d17 output from the moving average unit 151. This allows generation of a more accurate enable.

The moving average unit 151 may be replaced by a low-pass filter. Furthermore, for example if the possibility of the deformation of the waveforms of the signal d11 and the signal d12 is sufficiently low, it is also possible that the moving average unit 151 is not provided.

The subcarrier correlation filter 152 is a filter having filter coefficients corresponding to the waveform of the subcarrier.

As described above, the number of samples (clocks) in a 1-etu interval is 128 and the number of samples in one subcarrier cycle is 16. Therefore, the 1-etu interval is equivalent to eight subcarrier cycles. For example, the code bit sequence obtained when a signal modulated by the subcarrier is binarized during two subcarrier cycles is given as (1, 1, 1, 1, 1, 1, 1, 1, −1, −1, −1, −1, −1, −1, −1, −1, 1, 1, 1, 1, 1, 1, 1, 1, −1, −1, −1, −1, −1, −1, −1, −1).

In this code bit sequence, the sign is reversed every eight samples. Thus, the cycle of this code bit sequence is 16 samples. That is, this code bit sequence corresponds to the shape of a rectangular wave in which the signal level oscillations in such a manner as to change to the higher level and the lower level alternately with the same cycle as that of the subcarrier. This code bit sequence is used as filter coefficients of the ¼-etu interval length. Two subcarrier cycles are equivalent to the ¼-etu interval.

The subcarrier correlation filter 152 calculates the correlation value between the I-signal and the Q-signal and the subcarrier of two cycles by using the above-described filter coefficients of the ¼-etu interval length. Specifically, the subcarrier correlation filter 152 calculates each of the inner products of the filter coefficients of the ¼-etu interval length and the I-signal and the Q-signal of 32 samples, and defines the absolute values of the calculation results as the I-component subcarrier correlation value and the Q-component subcarrier correlation value. Specifically, if the subcarrier components on the I-signal and the Q-signal are binarized equally to the above-described filter coefficients of the ¼-etu interval length, the correlation value between the I-signal and the Q-signal in this ¼-etu interval and the subcarrier is high.

The I-component subcarrier correlation value and the Q-component subcarrier correlation value are output as a signal d13 and a signal d14, respectively, and supplied to the IQ mean square unit 153.

The IQ mean square unit 153 calculates the mean square of each of the signal d13 and the signal d14 and outputs the calculation result as a signal d15.

The synchronization processor 154 detects the frame head (communication start) described above with reference to FIG. 2 based on the signal d15, the signal d16, and the signal d17. As described above, in the Type A system, a data value "1" obtained by superimposing the subcarrier only during the first-half period of 1 etu comes as the first-bit received signal (start of communication). This serves as the frame header information.

For example, when the level of the signal d15 surpasses the threshold set in advance in the ½-etu interval (64 samples) from the start of the oscillation of the signal d16 and the signal d17, the synchronization processor 154 detects this etu as the frame head (communication start). When detecting the frame head (communication start), the synchronization processor 154 sets and outputs a frame detection flag.

Furthermore, the synchronization processor 154 generates e.g. a clock of every one subcarrier cycle by detecting the peaks of the waveforms of the signal d16 and the signal d17. The synchronization processor 154 has a configuration having e.g. a digital phase-locked loop (PLL) circuit and so forth, and generates a pulse of a clock in linkage with the peaks of the waveforms of the signal d16 and the signal d17.

The synchronization processor 154 can generate an enable of every ½ etu by outputting a pulse of an enable every four subcarrier cycles by the above-described clock, for example. Furthermore, the synchronization processor 154 can generate an enable of every 1 etu by outputting a pulse of an enable every eight subcarrier cycles by the above-described clock, for example.

Each of the enable of every ½ etu and the enable of every 1 etu is output in synchronization with the symbol with a waveform resulting from bit coding (series representing one bit).

Specifically, the synchronization processor 154 can detect the timing of the first cycle of the subcarrier in one etu based on the waveforms of the signal d16 and the signal d17 in the etu detected as the frame head as described above. Furthermore, the synchronization processor 154 can generate a signal d19 as the clock (enable) of every ½ etu and a signal d20 as the clock (enable) of every 1 etu in synchronization with the detected timing.

As just described, the synchronization processor 154 generates the signal d19 as the enable of every ½ etu and the signal d20 as the enable of every 1 etu by using not only the signal d15 but also the signal d16 and the signal d17.

The setting is so made that the mean square value (signal d15) of the output value of the subcarrier correlation filter 152 at the timing when the oscillation direction of the rectangular waveform of the signal d11 corresponds with the upward arrowheads and the downward arrowheads surpasses the threshold. In the above-described example, the setting is so made that the mean square value surpasses the threshold at the timing when the oscillation direction of the waveform of two cycles of the subcarrier corresponds with the upward arrowheads and the downward arrowheads. Therefore, in the signal d15, which is obtained by taking into consideration the correlation value with respect to the subcarrier, the oscillation of the first cycle of the subcarrier is small. Thus, it is difficult to accurately detect the peak of the first cycle of the subcarrier from the signal d15.

Therefore, the synchronization processor 154 generates the signal d19 as the clock of every ½ etu and the signal d20 as the clock of every 1 etu by using not only the signal d15 but also the signal d16 and the signal d17.

The signal d15 output from the IQ mean square unit 153 is supplied also to the threshold determiner 155. The threshold determiner 155 compares the level of the signal d15 with the threshold set in advance based on the timing specified by the signal d19, to thereby determine whether or not subcarrier modulation is carried out every ½-etu interval.

Here, for example, suppose that the value of the level of the signal d15 is held by a shift register or the like provided inside the threshold determiner 155 and the maximum value in the ½-etu interval is sequentially updated. Furthermore, the threshold determiner 155 compares the maximum value of the level of the signal d15 of each ½-etu interval with the threshold set in advance, to thereby determine whether or not subcarrier modulation is carried out.

In addition, the threshold determiner 155 identifies the series of the symbol represented by this etu based on the timing specified by the signal d20. Specifically, the threshold determiner 155 identifies the series of the symbol represented by this etu by the system of identification of the series of a symbol, described above with reference to FIG. 9.

For example, if the first-half ½-etu interval is a subcarrier-present interval and the second-half ½-etu interval is a subcarrier-absent interval, the symbol can be identified as series D and thus the threshold determiner 155 outputs a bit representing a value 1 as demodulated data.

If the first-half ½-etu interval is a subcarrier-absent interval and the second-half ½-etu interval is a subcarrier-present interval, the symbol can be identified as series E and thus the threshold determiner 155 outputs a bit representing a value 0 as demodulated data.

If the first-half ½-etu interval is a subcarrier-absent interval and the second-half ½-etu interval is also a subcarrier-absent interval, the symbol can be identified as series F and thus the threshold determiner 155 outputs a bit sequence or the like representing the communication end as demodulated data.

If the first-half ½-etu interval is a subcarrier-present interval and the second-half ½-etu interval is also a subcarrier-present interval, this symbol is a symbol that can not exist in terms of bit coding and thus the threshold determiner 155 identifies that collision has occurred. Specifically, it is identified that two contactless IC cards simultaneously exist near the antenna 112 of the reader/writer 111 and collision has occurred because of simultaneous reception of signals transmitted from two contactless IC cards. In this case, the threshold determiner 155 outputs a collision flag.

In this manner, the threshold determiner 155 can identify the series of the symbol based on the result of the determination as to whether the subcarrier is present or absent and can output the demodulated data of the result as a signal d21.

Figure 14:
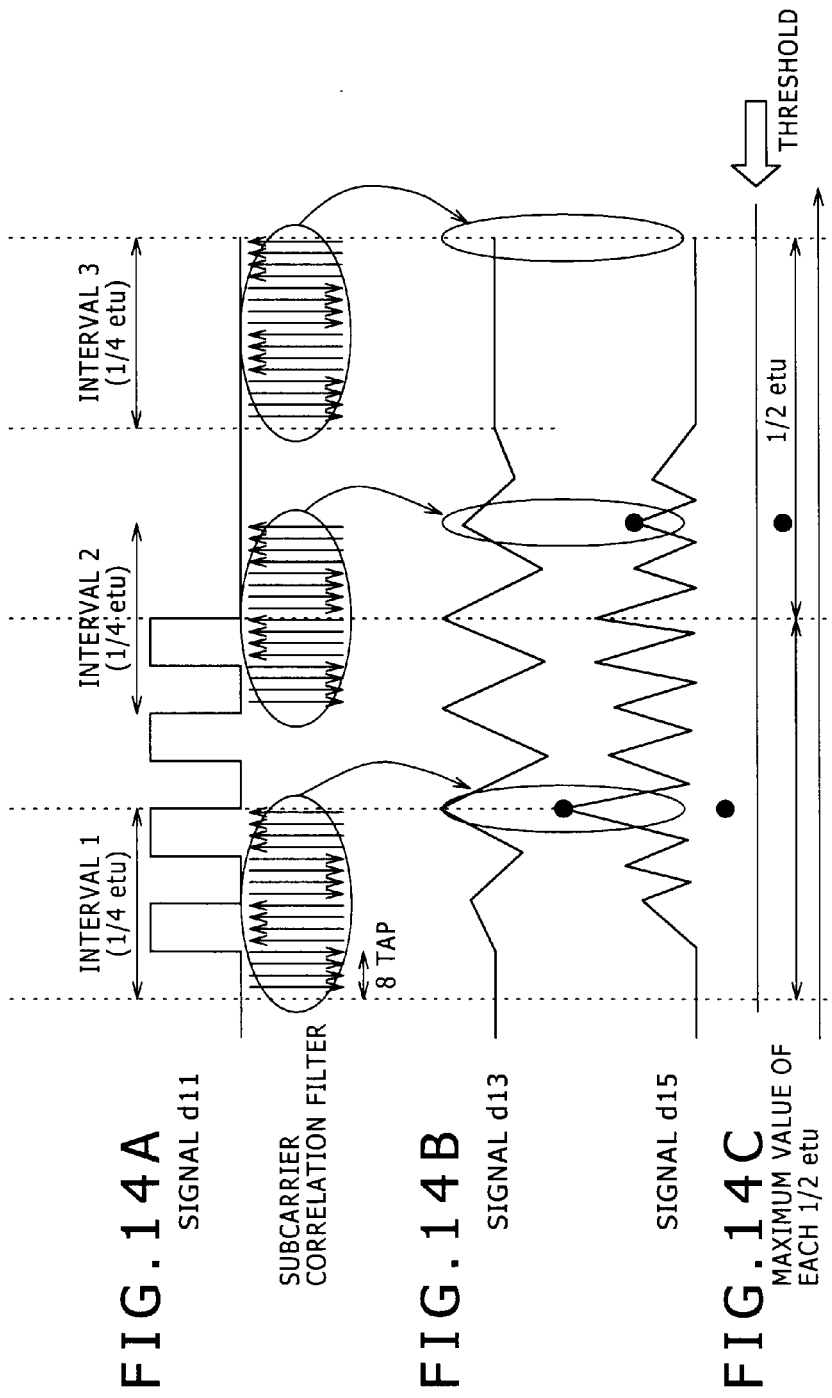
FIGS. 14A to 14C are diagrams for explaining an output result of a subcarrier correlation filter in FIG. 13 and determination by a threshold determiner.

FIGS. 14A to 14C are diagrams for explaining the output result of the subcarrier correlation filter 152 and the determination by the threshold determiner 155.

FIG. 14A is a diagram showing the waveform of the signal d11. In FIG. 14A, the waveform of the signal d11 is so shown that the abscissa indicates the time and the ordinate indicates the signal level. This example shows a waveform when a signal in which the first-half ½-etu interval is a subcarrier-present interval and the second-half ½-etu interval is a subcarrier-absent interval (series D) is received as a signal transmitted from a contactless IC card.

Furthermore, FIG. 14A virtually shows the filter coefficients of the subcarrier correlation filter 152, through which the signal d11 is made to pass, by arrowheads represented below the waveform in FIG. 14A. Specifically, the upward arrowhead indicates a filter coefficient "1," and the downward arrowhead indicates a filter coefficient "−1." In the diagram, four upward arrowheads and four downward arrowheads are represented per one cycle of the subcarrier for convenience.

However, in practice, eight upward arrowheads and eight downward arrowheads are necessary per one cycle of the subcarrier.

The output value of the subcarrier correlation filter 152 becomes the maximum at the timing when the oscillation direction of the rectangular waveform of the signal d11 corresponds with the upward arrowheads and the downward arrowheads.

FIG. 14B is a diagram for explaining an example of the waveforms of the signal d13 and the signal d15. In FIG. 14B, the waveform of the signal d13 output from the subcarrier correlation filter 152 and the waveform of the signal d15 output from the IQ mean square unit 153 are so shown that the abscissa indicates the time and the ordinate indicates the signal level. In this diagram, the waveform of the signal d13 and the waveform of the signal d15 are so shown as to be juxtaposed in the vertical direction in the diagram, for easy understanding of the description. However, two waveforms have signal levels that are originally represented on different ordinates.

In the waveform of the signal d13, the signal level, which is at zero at the time on the leftmost side in the diagram, oscillates in such a manner as to take a positive or negative value with the elapse of time. In the waveform of the signal d15, the signal level, which is at zero at the time on the leftmost side in the diagram, oscillates in such a manner as to take a positive value with the elapse of time.

The output values of the subcarrier correlation filter 152 about the ¼-etu intervals shown as Interval 1 to Interval 3, respectively, in FIG. 14A are output as the waveforms at the positions of the ellipses indicated by the arrowheads in FIG. 14B.

The signal levels at the positions indicated by the black circles as the peaks of the waveform of the signal d15 in FIG. 14B are the maximum value in the first-half ½-etu interval and the maximum value in the second-half ½-etu interval, respectively.

FIG. 14C is a diagram in which the maximum values of the level of the signal d15 are plotted in the first-half ½-etu interval and the second-half ½-etu interval. Specifically, the black circles in the diagram represent the plotted maximum values. As described above, the threshold determiner 155 compares the maximum value of the level of the signal d15 in the ½-etu interval with the threshold set in advance based on the timing specified by the signal d19, to thereby determine whether or not subcarrier modulation is carried out every ½-etu interval.

In the present case, the maximum value in the first-half ½-etu interval surpasses the threshold and thus it turns out that subcarrier modulation is carried out. Furthermore, the maximum value in the second-half ½-etu interval does not surpass the threshold and thus it turns out that subcarrier modulation is not carried out. The vertical position of the straight line along the horizontal direction in the diagram indicates the threshold.

That is, the setting is so made that the mean square value (signal d15) of the output value of the subcarrier correlation filter 152 at the timing when the oscillation direction of the rectangular waveform of the signal d11 corresponds with the upward arrowheads and the downward arrowheads surpasses the threshold.

Although the signal d11 is shown in FIG. 14A and the signal d13 is shown in FIG. 14B, the signal d12 and the signal d14 are also used to generate the signal d15 in the actual processing.

Figure 15:
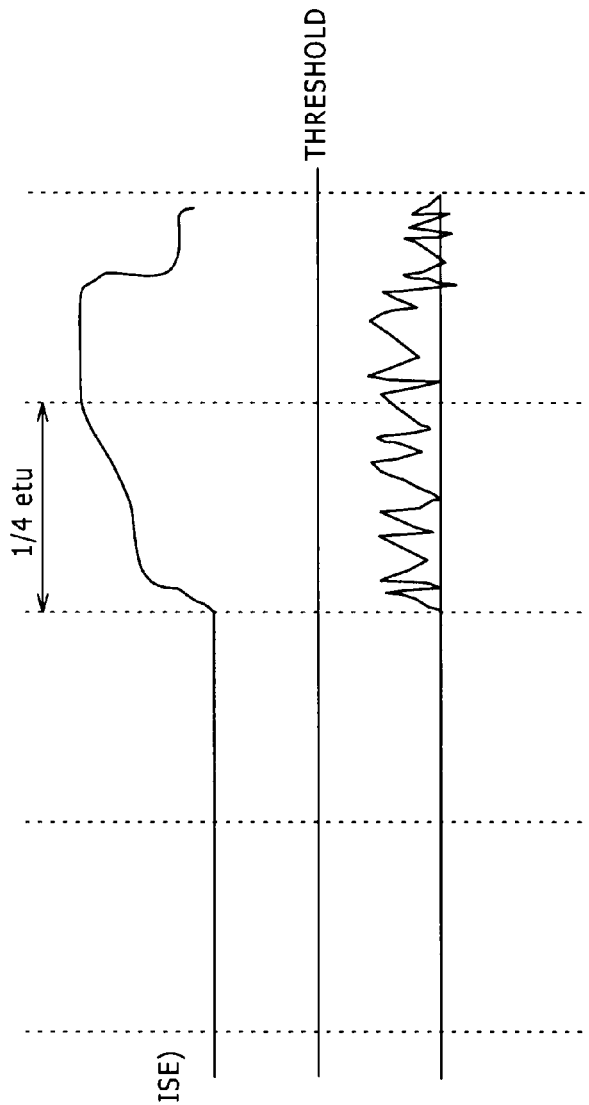
FIGS. 15A and 15B are diagrams for explaining the case in which noise is included in a signal transmitted from the contactless IC card.

FIGS. 15A and 15B are diagrams for explaining the case in which noise is included in a signal transmitted from a contactless IC card.

FIG. 15A is a diagram showing the waveform of the signal d11. In FIG. 15A, the waveform of the signal d11 is so shown that the abscissa indicates the time and the ordinate indicates the signal level. This example shows a waveform when a signal in which the first-half ½-etu interval is a subcarrier-absent interval and the second-half ½-etu interval is also a subcarrier-absent interval (series F) is received as a signal transmitted from a contactless IC card. However, in this example, the waveform of the second-half ½-etu interval, which is originally flat, includes oscillation due to noise.

Specifically, if the signal d11 is modulated by the subcarrier, a rectangular waveform including oscillation at a certain cycle is observed. However, the waveform of the second-half ½-etu interval of FIG. 15A includes irregular oscillation.

FIG. 15B is a diagram showing the waveform of the signal d15. In FIG. 15B, the waveform of the signal d15 corresponding to the signal d11 of FIG. 15A is so shown that the abscissa indicates the time and the ordinate indicates the signal level.

As shown in FIG. 15B, in the signal d15, which is output through the processing by the IQ mean square unit 153 for the output value of the subcarrier correlation filter 152, the waveform of the second-half ½-etu interval, which is originally flat, includes oscillation due to noise. However, because the subcarrier correlation filter 152 has the above-described filter coefficients, the correlation value with respect to the oscillation of the signal d11 in the second-half ½-etu interval due to the noise is sufficiently small. Specifically, the oscillation direction of the waveform represented by upward arrowheads and downward arrowheads like those shown in FIG. 14A is greatly different from the direction of the oscillation due to the noise in FIG. 15A. Thus, the correlation between this noise and the subcarrier is low, so that a low correlation value is output.

As shown in FIG. 15B, the maximum value of the level of the signal d15 surpasses the threshold in neither the first-half ½ etu nor the second-half ½ etu. This allows the threshold determiner 155 to identify that, in this etu, subcarrier modulation is carried out in neither the first-half ½-etu interval nor the second-half ½-etu interval and thus demodulate series F from the signal d11 of FIG. 15A.

Although the signal d11 is shown in FIG. 15A, naturally the signal d12 is also used to generate the signal d15 in the actual processing.

Figure 16:
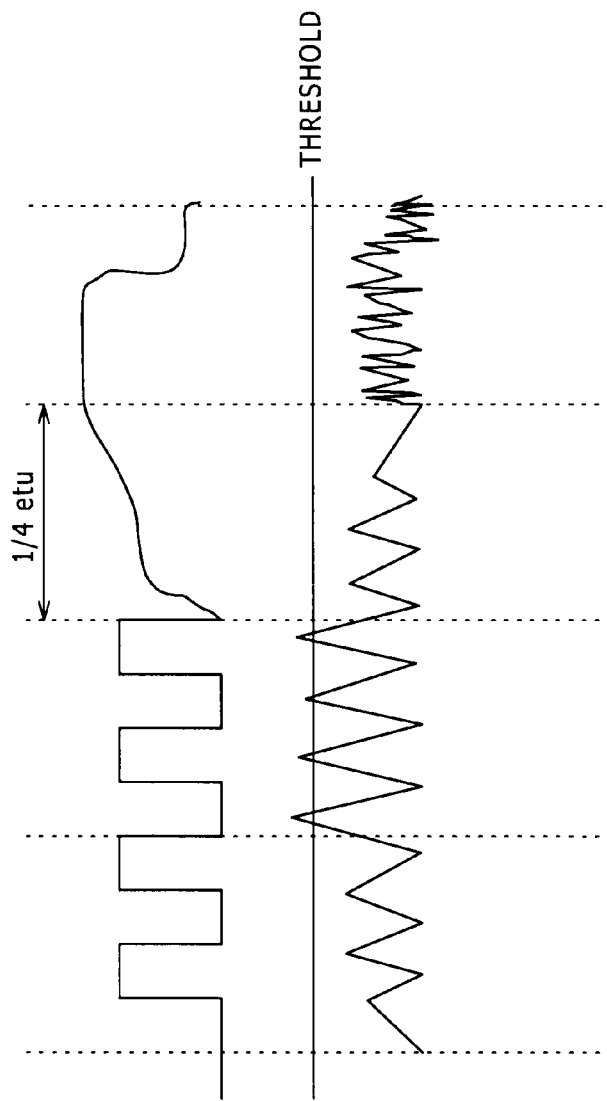
FIGS. 16A and 16B are diagrams for explaining another example of the case in which noise is included in a signal transmitted from the contactless IC card.

FIGS. 16A and 16B are diagrams for explaining another example of the case in which noise is included in a signal transmitted from a contactless IC card.

FIG. 16A is a diagram showing the waveform of the signal d11. In FIG. 16A, the waveform of the signal d11 is so shown that the abscissa indicates the time and the ordinate indicates the signal level. This example shows a waveform when a signal in which the first-half ½-etu interval is a subcarrier-present interval and the second-half ½-etu interval is a subcarrier-absent interval (series D) is received as a signal transmitted from a contactless IC card. However, in this example, the waveform of the second-half ½-etu interval, which is originally flat, includes oscillation due to noise.

Specifically, if the signal d11 is modulated by the subcarrier, a rectangular waveform including oscillation at a certain cycle is observed. However, the waveform of the second-half ½-etu interval of FIG. 16A includes irregular oscillation.

FIG. 16B is a diagram showing the waveform of the signal d15. In FIG. 16B, the waveform of the signal d15 corresponding to the signal d11 of FIG. 16A is so shown that the abscissa indicates the time and the ordinate indicates the signal level.

As shown in FIG. 16B, in the signal d15, which is output through the processing by the IQ mean square unit 153 for the output value of the subcarrier correlation filter 152, the waveform of the second-half ½-etu interval, which is originally flat, includes oscillation due to noise. However, because the subcarrier correlation filter 152 has the above-described filter coefficients, the correlation value with respect to the oscillation of the signal d11 in the second-half ½-etu interval due to the noise is sufficiently small. Specifically, the oscillation direction of the waveform represented by upward arrowheads and downward arrowheads like those shown in FIG. 14A is greatly different from the direction of the oscillation due to the noise in FIG. 16A. Thus, the correlation between this noise and the subcarrier is low, so that a low correlation value is output.

As shown in FIG. 16B, the maximum value of the level of the signal d15 surpasses the threshold in first-half ½ etu but does not surpass the threshold in second-half ½ etu. This allows the threshold determiner 155 to identity that, in this etu, subcarrier modulation is carried out in the first-half ½-etu interval and is not carried out in the second-half ½-etu interval and thus demodulate series D from the signal d11 of FIG. 16A.

Although the signal d11 is shown in FIG. 16A, naturally the signal d12 is also used to generate the signal d15 in the actual processing.

As just described, in the embodiment of the present invention, the correlation value with respect to the subcarrier is taken into consideration for the signal used for determining whether the subcarrier is present or absent. Therefore, the problem that noise is erroneously regarded as the subcarrier is absent. Due to this feature, for example even if a waveform including noise is received as described above with reference to FIGS. 15A and 15B and FIGS. 16A and 16B, the series of the symbol that should be demodulated originally can be demodulated.

Furthermore, in the embodiment of the present invention, signals obtained without taking into consideration the correlation value with respect to the subcarrier (signal d16 and signal d17) are used as the signals used for generation of the enable. Thus, generation of a more accurate enable is possible. This is because, in the embodiment of the present invention, the oscillation of the first cycle of the subcarrier can be detected in the generation of the enable and each enable can be output in synchronization with the symbol (series representing one bit).

As described above, in the signal obtained by taking into consideration the correlation value with respect to the subcarrier, the oscillation of the first cycle of the subcarrier is small. Thus, it is difficult to accurately detect the peak of the first cycle of the subcarrier from the signal obtained by taking into consideration the correlation value with respect to the subcarrier.

As a solution thereto, in the embodiment of the present invention, the enable is generated by detecting the peaks of the signal d16 and the signal d17, which are obtained without taking into consideration the correlation value with respect to the subcarrier. Therefore, the oscillation of the first cycle of the subcarrier can be detected and each enable can be output in synchronization with the symbol.

Figure 17:
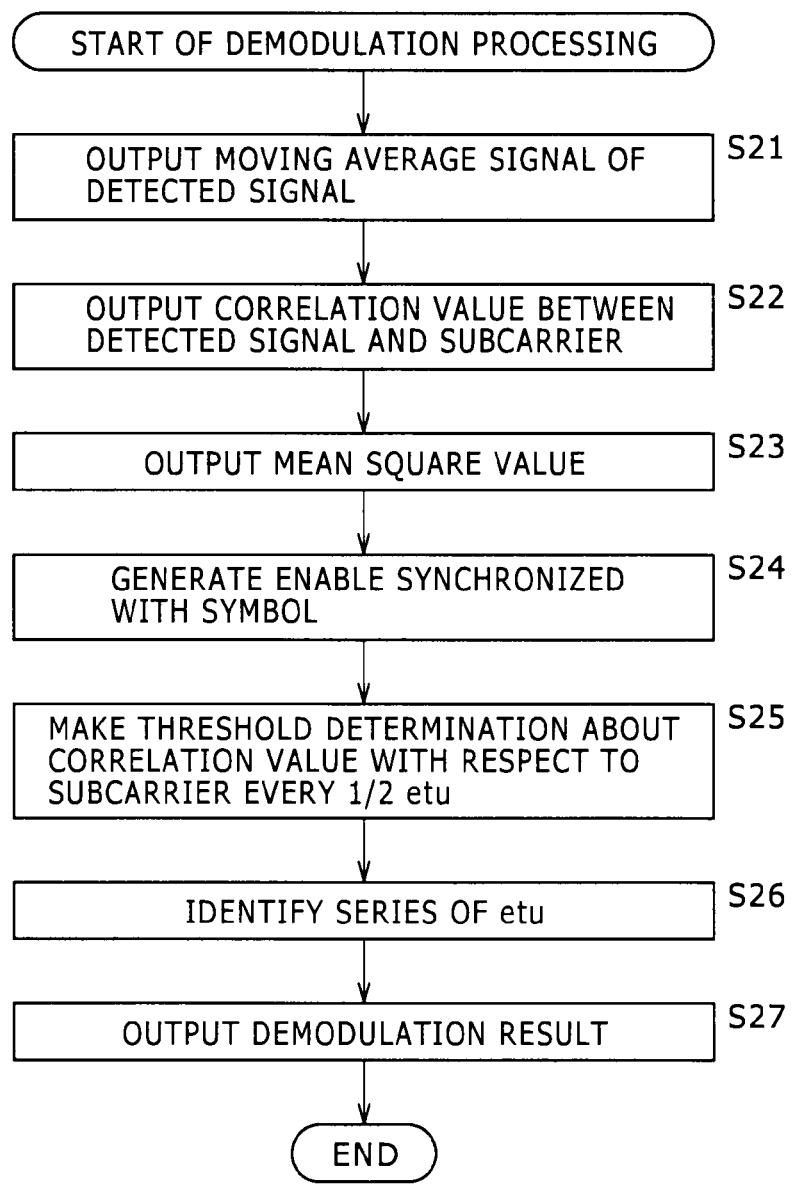
FIG. 17 is a flowchart for explaining demodulation processing.

Next, with reference to a flowchart of FIG. 17, an example of the demodulation processing by the demodulator 134 according to the embodiment of the present invention will be described below.

In a step S21, the moving average unit 151 outputs the moving average signals of the detected signals.

At this time, about the I-signal and the Q-signal as the detected signals output from the analog quadrature detector 133, the average of the signal level of the waveform in the ⅛-etu interval (one subcarrier cycle) is calculated. Subsequently, the signal d16 and the signal d17 are output as the moving average signals output from the moving average unit 151.

In a step S22, the subcarrier correlation filter 152 outputs the correlation value between the detected signals and the subcarrier.

At this time, the above-described code bit sequence is used as the filter coefficients of the ¼-etu interval length, and the subcarrier correlation filter 152 calculates the correlation value between the I-signal and the Q-signal and the subcarrier of two cycles. Specifically, the subcarrier correlation filter 152 calculates each of the inner products of the filter coefficients of the ¼-etu interval length and the I-signal and the Q-signal of 32 samples, and defines the absolute values of the calculation results as the I-component subcarrier correlation value and the Q-component subcarrier correlation value. The I-component subcarrier correlation value and the Q-component subcarrier correlation value are output as the signal d13 and the signal d14, respectively.

In a step S23, the IQ mean square unit 153 calculates the mean square of the subcarrier correlation values (each of the signal d13 and the signal d14) output through the processing of the step S22 and outputs the calculated mean square as the signal d15.

In a step S24, the synchronization processor 154 generates an enable synchronized with the symbol based on the mean square value (signal d15) output through the processing of the step S23 and the moving average signals (signal d16 and signal d17) output through the processing of the step S21.

At this time, the frame head (communication start) is detected based on the oscillation of the signal d16 and the signal d17 and the level of the signal d15. Furthermore, by detecting the peaks of the waveforms of the signal d16 and the signal d17, the signal d19 as a clock of every ½ etu and the signal d20 as a clock of every 1 etu are generated.

In a step S25, the threshold determiner 155 makes a threshold determination for the maximum value of the mean square value (signal d15) output through the processing of the step S23 every ½ etu based on the enables (signal d19 and signal d20) generated by the processing of the step S24.

At this time, the maximum value of the level of the signal d15 output from the IQ mean square unit 153 as the mean square of the subcarrier correlation values is compared with the threshold set in advance, and thereby whether or not subcarrier modulation is carried out is determined every ½-etu interval.

In a step S26, the threshold determiner 155 identifies the series of the symbol represented by this etu based on the determination result by the processing of the step S25.

At this time, the threshold determiner 155 identifies the series of the symbol represented by this etu by the system of identification of the series of a symbol, described above with reference to FIG. 9 for example.

In a step S27, the threshold determiner 155 outputs data corresponding to the series of the symbol identified by the processing of the step S26 as the demodulation result.

The demodulation processing is executed in this manner.

In the example described above with reference to FIG. 12, a signal received by the antenna 112 of the reader/writer 111 is supplied to the analog quadrature detector 133. However, a signal received by the antenna may be subjected to analog envelope detection.

Figure 18:
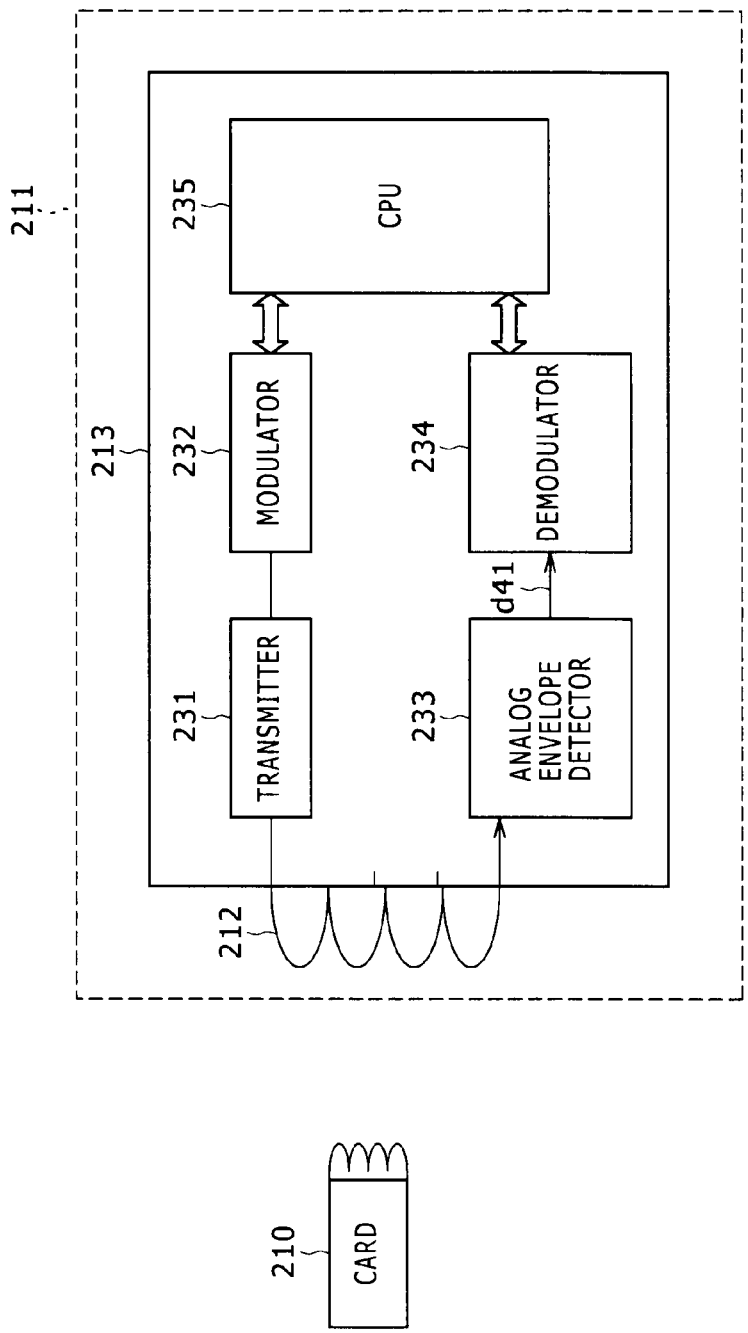
FIG. 18 is a block diagram showing another configuration example of the communication system composed of a contactless IC card and a reader/writer according to one embodiment of the present invention.

FIG. 18 is a block diagram showing another configuration example of the communication system composed of a contactless IC card and a reader/writer according to one embodiment of the present invention. In the example of FIG. 18, a contactless IC card 210 and a reader/writer 211 communicate with each other by the Type A communication system prescribed by ISO14443-3.

In FIG. 18, the contactless IC card 210 is similar to the contactless IC card 110 in FIG. 12. The reader/writer 211 corresponds to the reader/writer 111 in FIG. 12, but the internal configuration thereof is different from that in FIG. 12.

Specifically, instead of the analog quadrature detector 133 provided in the reader/writer 111 in the example of FIG. 12, an analog envelope detector 233 is provided in the reader/writer 211 in the example of FIG. 18.

In the example of FIG. 18, a signal received by an antenna 212 of the reader/writer 211 is supplied to the analog envelope detector 233. Subsequently, the analog envelope detector 233 carries out envelope detection for the received signal and extracts a subcarrier component from the received signal. The detected signal is supplied to a demodulator 234 via a signal line d41.

The analog envelope detector 233 carries out A/D conversion of the envelope-detected signal and carries out oversampling at a frequency of 13.56 MHz. At this time, for example, the number of samples in the 1-etu interval is 128 (13.56 MHz÷106 KHz). Furthermore, because the subcarrier frequency in the Type A communication system is 847 KHz as described above, the number of samples in one subcarrier cycle is 16 (=13.56 MHz÷847 KHz).

In the example of FIG. 18, due to the provision of the analog envelope detector 233, the configuration of the demodulator 234 is different from that of the demodulator 134 in FIG. 12 as described later.

The other configuration in FIG. 18 is the same as that in FIG. 12 and therefore detailed description thereof is omitted.

Figure 19:
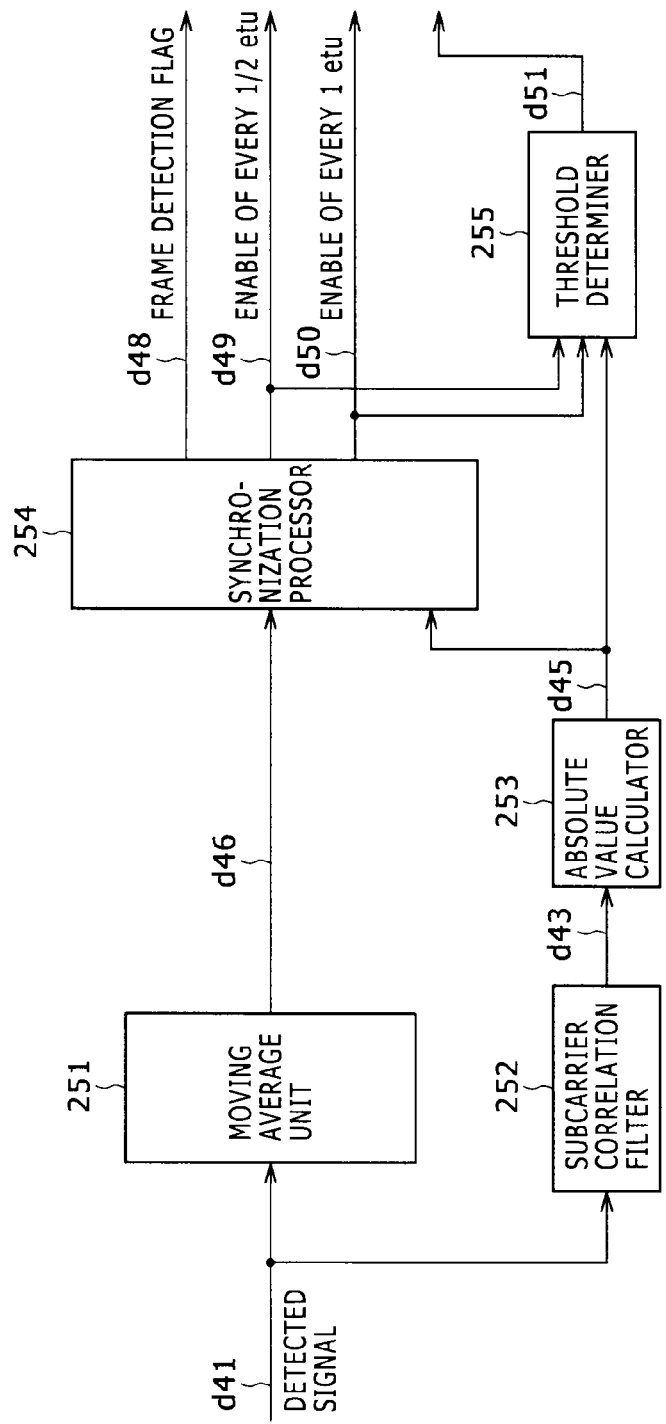
FIG. 19 is a block diagram showing a detailed configuration example of a demodulator in FIG. 18.

FIG. 19 is a block diagram showing a detailed configuration example of the demodulator 234 in FIG. 18. As shown in FIG. 19, the demodulator 234 includes a moving average unit 251, a subcarrier correlation filter 252, an absolute value calculator 253, a synchronization processor 254, and a threshold determiner 255.

As shown in FIG. 19, the detected signal output from the analog envelope detector 233 is supplied to the moving average unit 251 and the subcarrier correlation filter 252 via the signal line d41.

The moving average unit 251 calculates the average of the signal level of the waveform in the ⅛-etu interval (one subcarrier cycle) about the signal d41. For example, the value of integral of the signal level of the waveform in the ⅛-etu interval at the time is calculated, and thereby the averages are sequentially calculated. The signal d41 is generally output as a rectangular wave. However, the waveform of a signal d46 output from the moving average unit 251 has a shape close to a saw-tooth wave.

The signal d46 obtained through the processing by the moving average unit 251 has almost the same waveform as that obtained when the signal d41 is made to pass through a low-pass filter to cut high-frequency noise. Due to this scheme, for example even if the signal d41 is deformed to a waveform that makes it hard to determine one cycle due to the influence of the reception environment and so forth, the interval of one cycle of the subcarrier can be easily identified by detecting the peak of the waveform of the signal d46. That is, the synchronization processor 254 generates an enable based on the signal d46 output from the moving average unit 251. This allows generation of a more accurate enable.

The subcarrier correlation filter 252 is a filter having filter coefficients corresponding to the waveform of the subcarrier. These filter coefficients are similar to those of the subcarrier correlation filter 152 in FIG. 13 and therefore detailed description thereof is omitted.

The subcarrier correlation value is output as a signal d43 and supplied to the absolute value calculator 253.

The absolute value calculator 253 calculates the absolute value of the signal d43 and outputs it as a signal d45.

The synchronization processor 254 detects the frame head (communication start) described above with reference to FIG. 2 based on the signal d45 and the signal d46.

For example, when the level of the signal d45 surpasses the threshold set in advance while the signal d46 oscillates, the synchronization processor 254 detects this etu as the frame head (communication start). When detecting the frame head (communication start), the synchronization processor 254 sets and outputs a frame detection flag.

Furthermore, the synchronization processor 254 detects the peak of the waveform of the signal d46 to thereby generate a signal d49 as an enable of every ½ etu and a signal d50 as an enable of every 1 etu. Each of the enables (clocks) generated by the synchronization processor 254 is output in synchronization with the symbol with a waveform resulting from bit coding (series representing one bit). Specifically, as described above, the timing of the first cycle of the subcarrier can be detected in the etu detected as the frame head, and the enable of every ½ etu and the enable of every 1 etu can be generated by generating a clock in synchronization with the detected timing.

The signal d45 output from the absolute value calculator 253 is supplied also to the threshold determiner 255. The threshold determiner 255 compares the maximum value of the level of the signal d45 with the threshold set in advance based on the timing specified by the signal d49, to thereby determine whether or not subcarrier modulation is carried out every ½-etu interval.

The threshold determiner 255 identifies the series of the symbol represented by this etu based on the timing specified by the signal d50. Specifically, the threshold determiner 255 identifies the series of the symbol represented by this etu by the system of identification of the series of a symbol, described above with reference to FIG. 9.

In this manner, the threshold determiner 255 can identify the series of the symbol based on the result of the determination as to whether the subcarrier is present or absent and can output the demodulated data of the result as a signal d51.

As just described, the concept of the present invention can be applied also to the case in which a signal received by the antenna is subjected to analog envelope detection.

The series of processing described above in the present specification encompasses processing that is executed in a time-series manner in the described order of course, and encompasses also processing that is executed in parallel or individually even when it is not necessarily executed in a time-series manner.

Embodiments of the present invention are not limited to the above-described embodiment, but various changes can be made without departing from the gist of the present invention.

The present application contains subject matter related to that disclosed in Japanese Priority Patent Application JP 2009-283761 filed in the Japan Patent Office on Dec. 15, 2009, the entire content of which is hereby incorporated by reference.

What is claimed is:

1. A signal processing device comprising:
   one or more processors operable to:
   receive a signal transmitted from another device and calculate one or more correlation values between the received signal and a pattern of a waveform of a known signal in a first interval and a second interval, the calculated one or more correlation values corresponding to maximum values of a product of the received signal and the known signal in the first interval and the second interval, and output the calculated one or more correlation values as a correlation signal in a time corresponding to one symbol period;
   determine whether the received signal is modulated in the first interval and the second interval by the known signal based on the correlation signal and a first enable signal; and
   identify a symbol from a plurality of symbols based on the determination in the symbol period,
   wherein the one or more processors are operable to identify a series of the plurality of symbols based on the correlation signal and a second enable signal, different from the first enable signal, and
   wherein the first enable signal and the second enable signal are generated based on the correlation signal and the received signal.

2. The signal processing device according to claim 1, wherein the one or more processors are operable to identify the symbol representing a start timing of a frame of data modulated and sent by the signal transmitted from the another device.

3. The signal processing device according to claim 1, wherein the one or more processors are operable to output a demodulation result of data modulated and sent by the signal transmitted from the another device or information representing an end timing of a frame in accordance with the identified symbol from the plurality of symbols.

4. The signal processing device according to claim 1, wherein the signal transmitted from the another device modulates data subjected to bit coding by a predetermined system based on a subcarrier of a predetermined frequency.

5. The signal processing device according to claim 4, wherein the one or more processors are operable to calculate a correlation value between the received signal and a pattern of a waveform of the subcarrier by executing filter processing for the received signal with use of a filter coefficient obtained by binarizing an oscillation of the subcarrier, and determine whether the received signal is modulated by the subcarrier in the first interval and the second interval by determining whether a maximum value of the correlation value surpasses a predetermined threshold value.

6. The signal processing device according to claim 4, wherein the signal transmitted from the another device is a signal modulated based on a communication system compatible with ISO/IEC14443.

7. A signal processing method comprising:
   calculating one or more correlation values in a first interval and a second interval between a received signal and a pattern of a waveform of a known signal, the calculated one or more correlation values corresponding to maximum values of a product of the received signal and the known signal in the first interval and the second interval;
   outputting a correlation signal based on the calculated one or more correlation values in a time corresponding to one symbol period;
   determining whether the received signal is modulated by the known signal in the first interval and the second interval based on the correlation signal and a first enable signal; and
   identifying a symbol from a plurality of symbols based on a result of the determination in the symbol period,
   wherein a series of the plurality of symbols are identified based on the correlation signal and a second enable signal, different from the first enable signal, and
   wherein the first enable signal and the second enable signal are generated based on the correlation signal and the received signal.

8. A signal processing device comprising:
   a correlation signal output unit configured to receive a signal transmitted from another device and calculate one or more correlation values between the received signal and a pattern of a waveform of a known signal in a first interval and a second interval, the calculated one or more correlation values corresponding to maximum values of a product of the received signal and the known signal in the first interval and the second interval, and output a correlation signal based on the calculated one or more correlation values that correspond to the maximum values in a time corresponding to one symbol period;
   a signal determiner configured to determine whether the received signal is modulated in the first interval and the second interval by the known signal based on the correlation signal and a first enable signal; and
   an identifier configured to identify a symbol from a plurality of symbols based on the determination in the symbol period,
   wherein the identifier is configured to identify a series of the plurality of symbols based on the correlation signal and a second enable signal, different from the first enable signal, and
   wherein the first enable signal and the second enable signal are generated based on the correlation signal and the received signal.

9. The signal processing device according to claim 8, wherein the time corresponding to one symbol period is equal to time corresponding to the first interval and the second interval.

10. The signal processing device according to claim 9, wherein the first interval and second interval further include a plurality of sub-intervals.

11. The signal processing device according to claim 8, further comprising:
    a moving average unit that is configured to calculate an average of the received signal transmitted from the another device, in the first interval and the second interval; and
    a mean square unit that is configured to calculate a mean square of the correlation signal.

12. The signal processing device according to claim 11, wherein one or both of the first enable signal and the second enable signal are generated based on an output from the moving average unit.

13. The signal processing method according to claim 7, further comprising calculating an average of the received signal transmitted from another device in the first interval and the second interval.

14. The signal processing method according to claim 7, further comprising calculating a mean square of the correlation signal.

15. The signal processing device according to claim 8, wherein
  the correlation signal output unit is further configured to generate one or both of the first enable signal and the second enable signal by identifying a start timing of one symbol in the signal transmitted from the another device based on a symbol representing a start timing of a frame of data modulated and sent by the signal transmitted from the another device.

* * * * *